(12) United States Patent
Hodge et al.

(10) Patent No.: US 7,389,031 B2
(45) Date of Patent: Jun. 17, 2008

(54) REFLECTION SUPPRESSION FOR AN OPTICAL FIBER

(75) Inventors: Ronald L. Hodge, Flowery Branch, GA (US); John J. Kenny, Suwanee, GA (US)

(73) Assignee: Wave7 Optics, Inc., Alpharetta, GA (US)

( * ) Notice: Subject to any disclaimer, the term of this patent is extended or adjusted under 35 U.S.C. 154(b) by 0 days.

(21) Appl. No.: 11/430,276

(22) Filed: May 8, 2006

(65) Prior Publication Data

US 2006/0251373 A1 Nov. 9, 2006

Related U.S. Application Data

(63) Continuation of application No. 10/686,688, filed on Oct. 15, 2003, now Pat. No. 7,058,260.

(60) Provisional application No. 60/418,271, filed on Oct. 15, 2002.

(51) Int. Cl.
*G02B 6/00* (2006.01)
*G02B 6/46* (2006.01)

(52) U.S. Cl. ...................... 385/135; 385/137

(58) Field of Classification Search .................. 385/135
See application file for complete search history.

(56) References Cited

U.S. PATENT DOCUMENTS

| | | | |
|---|---|---|---|
| 4,253,035 A | 2/1981 | Amitay | |
| 4,295,005 A | 10/1981 | Daugherty | |
| 4,495,545 A | 1/1985 | Dufresne et al. | |
| 4,500,990 A | 2/1985 | Akashi | |
| 4,654,891 A | 3/1987 | Smith | |
| 4,655,517 A | 4/1987 | Bryce | |
| 4,665,517 A | 5/1987 | Widmer | |
| 4,733,398 A | 3/1988 | Shibagaki et al. | |
| 4,763,317 A | 8/1988 | Lehman et al. | |
| 4,805,979 A | 2/1989 | Bossard | |

(Continued)

FOREIGN PATENT DOCUMENTS

CA 2107922 4/1995

(Continued)

OTHER PUBLICATIONS

Tian et al., "Raman Crosstalk in Fiber-Optic Hybrid CATV Systems with Wide Channel Separations," IEEE Phtonics Tech Letters, Jan. 2004, pp. 344-346, vol. 16.

(Continued)

*Primary Examiner*—M. R. Connelly-Cushwa
(74) *Attorney, Agent, or Firm*—King & Spalding LLP

(57) ABSTRACT

Forming a plurality of loops in an optical fiber around a spool adjacent to an exposed end face can suppress internal reflections from the exposed end face. The radius of the loops can attenuate light that is propagating to and from the end face by causing light to leak out of the optical fiber's core and into its cladding. The radius can be selected to control physical stress in the optical fiber and promote reliability. The radius and the number of loops can be selected to meet a return loss specification. The loops can be formed by coiling the optical fiber around a spool that includes a slot for holding the optical fiber until it is put into service.

16 Claims, 11 Drawing Sheets

U.S. PATENT DOCUMENTS

| | | | |
|---|---|---|---|
| 4,852,023 A | 7/1989 | Lee et al. | |
| 4,945,541 A | 7/1990 | Nakayama | |
| 4,956,863 A | 9/1990 | Goss | |
| 4,975,899 A | 12/1990 | Faulkner | |
| 5,105,336 A | 4/1992 | Jacoby | |
| 5,132,992 A | 7/1992 | Yurt et al. | |
| 5,144,267 A | 9/1992 | West, Jr. | |
| 5,179,591 A | 1/1993 | Hardy | |
| 5,189,725 A | 2/1993 | Bensel, III et al. | |
| 5,247,347 A | 9/1993 | Litteral et al. | |
| 5,249,194 A | 9/1993 | Sakanushi | |
| 5,253,250 A | 10/1993 | Schlafer et al. | |
| 5,253,275 A | 10/1993 | Yurt et al. | |
| 5,303,295 A | 4/1994 | West et al. | |
| 5,313,546 A | 5/1994 | Toffetti | |
| 5,325,223 A | 6/1994 | Bears | |
| 5,345,504 A | 9/1994 | West, Jr. | |
| 5,349,457 A | 9/1994 | Bears | |
| 5,365,585 A | 11/1994 | Puhl et al. | |
| 5,365,588 A | 11/1994 | Bianco et al. | |
| 5,378,174 A | 1/1995 | Brownlie et al. | |
| 5,402,315 A | 3/1995 | Reichle et al. | |
| 5,412,498 A | 5/1995 | Arstein et al. | |
| 5,432,875 A | 7/1995 | Korkowski et al. | |
| 5,469,507 A | 11/1995 | Canetti et al. | |
| 5,495,549 A | 2/1996 | Schneider | |
| 5,509,099 A | 4/1996 | Hermsen | |
| 5,510,921 A | 4/1996 | Takai et al. | |
| 5,528,455 A | 6/1996 | Miles | |
| 5,528,582 A | 6/1996 | Bodeep | |
| 5,534,912 A | 7/1996 | Kostreski | |
| 5,541,917 A | 7/1996 | Farris | |
| 5,550,863 A | 8/1996 | Yurt et al. | |
| 5,557,317 A | 9/1996 | Nishio et al. | |
| 5,559,858 A | 9/1996 | Beveridge | |
| 5,566,099 A | 10/1996 | Shimada | |
| 5,572,347 A | 11/1996 | Burton et al. | |
| 5,572,348 A | 11/1996 | Carlson | |
| 5,572,349 A | 11/1996 | Hale | |
| 5,666,487 A | 9/1997 | Goodman et al. | |
| 5,694,232 A | 12/1997 | Parsay et al. | |
| 5,701,186 A | 12/1997 | Huber | |
| 5,706,303 A | 1/1998 | Lawrence | |
| 5,715,020 A | 2/1998 | Kuroiwa et al. | |
| 5,731,546 A | 3/1998 | Miles et al. | |
| RE35,774 E | 4/1998 | Moura et al. | |
| 5,769,159 A | 6/1998 | Yun | |
| 5,778,017 A | 7/1998 | Sato et al. | |
| 5,790,523 A | 8/1998 | Ritchie, Jr. | |
| 5,793,413 A | 8/1998 | Hylton | |
| 5,793,506 A | 8/1998 | Schmid | |
| 5,799,088 A | 8/1998 | Raike | |
| 5,802,089 A | 9/1998 | Link | |
| 5,822,102 A | 10/1998 | Bodeep et al. | |
| 5,861,966 A | 1/1999 | Ortel | |
| 5,867,485 A | 2/1999 | Chambers et al. | |
| 5,875,430 A | 2/1999 | Koether | |
| 5,880,864 A | 3/1999 | Williams | |
| 5,892,865 A | 4/1999 | Williams | |
| 5,953,690 A | 9/1999 | Lemon | |
| 5,969,836 A | 10/1999 | Foltzer | |
| 5,974,063 A | 10/1999 | Yoshida | |
| 6,002,692 A | 12/1999 | Wills | |
| 6,002,720 A | 12/1999 | Yurt et al. | |
| 6,041,056 A | 3/2000 | Bigham et al. | |
| 6,097,159 A | 8/2000 | Mogi | |
| 6,097,515 A | 8/2000 | Pomp et al. | |
| 6,144,702 A | 11/2000 | Yurt et al. | |
| 6,151,343 A | 11/2000 | Jurgensen | |
| 6,167,553 A | 12/2000 | Dent | |
| RE37,125 E | 4/2001 | Carlson | |
| 6,215,939 B1 | 4/2001 | Cloud | |
| 6,229,701 B1 | 5/2001 | Kung et al. | |
| 6,295,148 B1 | 9/2001 | Atlas | |
| 6,300,562 B1 | 10/2001 | Daoud | |
| 6,330,155 B1 | 12/2001 | Remsburg | |
| 6,336,201 B1 | 1/2002 | Geile et al. | |
| 6,342,004 B1 | 1/2002 | Lattimore et al. | |
| 6,356,369 B1 | 3/2002 | Farhan | |
| 6,360,320 B1 | 3/2002 | Ishiguro et al. | |
| 6,385,366 B1 | 5/2002 | Lin | |
| 6,421,150 B2 | 7/2002 | Graves | |
| 6,424,656 B1 | 7/2002 | Hoebeke | |
| 6,427,035 B1 | 7/2002 | Mahony | |
| 6,452,714 B1 | 9/2002 | Rollins | |
| 6,460,182 B1 | 10/2002 | Buabbud | |
| 6,463,068 B1 | 10/2002 | Lin et al. | |
| 6,483,635 B1 | 11/2002 | Wach | |
| 6,486,907 B1 | 11/2002 | Farber et al. | |
| 6,490,727 B1 | 12/2002 | Nazarathy et al. | |
| 6,493,335 B1 | 12/2002 | Darcie et al. | |
| 6,496,641 B1 | 12/2002 | Mahony | |
| 6,507,494 B1 | 1/2003 | Hutchison | |
| 6,529,301 B1 | 3/2003 | Wang | |
| 6,546,014 B1 | 4/2003 | Kramer et al. | |
| 6,577,414 B1 | 6/2003 | Feldman et al. | |
| 6,611,522 B1 | 8/2003 | Zheng et al. | |
| 6,621,975 B2 | 9/2003 | Laporte et al. | |
| 6,654,565 B2 | 11/2003 | Kenny | |
| 6,674,967 B2 | 1/2004 | Skrobko et al. | |
| 6,680,948 B1 | 1/2004 | Majd et al. | |
| 6,682,010 B2 * | 1/2004 | Pohl | 242/386 |
| 6,687,376 B1 | 2/2004 | Yamaguchi | |
| 6,687,432 B2 | 2/2004 | Schemmann et al. | |
| 6,707,024 B2 | 3/2004 | Miyamoto | |
| 6,738,983 B1 | 5/2004 | Rao et al. | |
| 6,740,861 B2 | 5/2004 | Matsuda | |
| 6,771,614 B1 | 8/2004 | Jones, IV et al. | |
| 6,775,137 B2 | 8/2004 | Chu et al. | |
| 6,778,785 B2 | 8/2004 | Imajo | |
| 6,804,256 B2 | 10/2004 | Chang | |
| 6,804,354 B1 | 10/2004 | Driscoll | |
| 6,807,188 B1 | 10/2004 | Blahut et al. | |
| 6,814,328 B1 * | 11/2004 | Li et al. | 242/400.1 |
| 6,823,385 B2 | 11/2004 | McKinnon, III et al. | |
| 6,889,007 B1 | 5/2005 | Wang et al. | |
| 6,912,075 B1 | 6/2005 | Ionov et al. | |
| 6,961,956 B2 | 11/2005 | Bontempi | |
| 6,973,271 B2 | 12/2005 | Farmer et al. | |
| 7,007,297 B1 | 2/2006 | Woodward | |
| 7,023,871 B2 | 4/2006 | Lind et al. | |
| 7,190,901 B2 | 3/2007 | Farmer et al. | |
| 7,218,855 B2 | 5/2007 | Whittlesey et al. | |
| 7,222,358 B2 | 5/2007 | Levinson et al. | |
| 7,227,871 B2 | 6/2007 | Dworkin et al. | |
| 7,242,694 B2 | 7/2007 | Beser | |
| 2001/0002195 A1 | 5/2001 | Fellman | |
| 2001/0002196 A1 | 5/2001 | Fellman | |
| 2001/0002486 A1 | 5/2001 | Kocher et al. | |
| 2001/0004362 A1 | 6/2001 | Kamiya | |
| 2001/0030785 A1 | 10/2001 | Pangrac | |
| 2002/0006197 A1 | 1/2002 | Carroll et al. | |
| 2002/0012138 A1 | 1/2002 | Graves | |
| 2002/0021465 A1 | 2/2002 | Moore, Jr. | |
| 2002/0027928 A1 | 3/2002 | Fang | |
| 2002/0039218 A1 | 4/2002 | Farmer | |
| 2002/0063924 A1 | 5/2002 | Kimbrough et al. | |
| 2002/0089725 A1 | 7/2002 | Farmer | |
| 2002/0105965 A1 | 8/2002 | Dravida et al. | |
| 2002/0106178 A1 * | 8/2002 | Bumgarner et al. | 385/137 |
| 2002/0116719 A1 | 8/2002 | Dapper et al. | |
| 2002/0135843 A1 | 9/2002 | Gruia | |
| 2002/0141159 A1 | 10/2002 | Bloemen | |
| 2002/0164026 A1 | 11/2002 | Huima | |

| | | | |
|---|---|---|---|
| 2002/0181925 A1 | 12/2002 | Hodge et al. | |
| 2003/0007210 A1 | 1/2003 | Kenny | |
| 2003/0007220 A1 | 1/2003 | Whittlesey et al. | |
| 2003/0011849 A1 | 1/2003 | Farmer et al. | |
| 2003/0016692 A1 | 1/2003 | Thomas et al. | |
| 2003/0072059 A1 | 4/2003 | Thomas et al. | |
| 2003/0086140 A1 | 5/2003 | Thomas et al. | |
| 2003/0090320 A1 | 5/2003 | Skrobko et al. | |
| 2003/0128983 A1 | 7/2003 | BuAbbud et al. | |
| 2003/0154282 A1 | 8/2003 | Horvitz | |
| 2003/0189587 A1 | 10/2003 | White et al. | |
| 2003/0194241 A1 | 10/2003 | Farmer | |
| 2003/0206564 A1 | 11/2003 | Mills et al. | |
| 2003/0206634 A1 | 11/2003 | Rose | |
| 2003/0223750 A1 | 12/2003 | Farmer et al. | |
| 2004/0086277 A1 | 5/2004 | Kenny | |
| 2004/0131357 A1 | 7/2004 | Farmer et al. | |
| 2004/0141747 A1 | 7/2004 | Kenny et al. | |
| 2004/0161217 A1 | 8/2004 | Hodge et al. | |
| 2004/0199502 A1 | 10/2004 | Wong et al. | |
| 2004/0221088 A1 | 11/2004 | Lisitsa et al. | |
| 2004/0253003 A1 | 12/2004 | Farmer et al. | |
| 2004/0264492 A1 | 12/2004 | Blahut | |
| 2004/0267730 A1 | 12/2004 | Dumais et al. | |
| 2005/0053350 A1 | 3/2005 | Hodge et al. | |
| 2005/0074241 A1 | 4/2005 | Farmer et al. | |
| 2005/0081244 A1 | 4/2005 | Barrett et al. | |
| 2005/0123001 A1 | 6/2005 | Craven et al. | |
| 2005/0125837 A1 | 6/2005 | Farmer et al. | |
| 2005/0175035 A1 | 8/2005 | Neely et al. | |
| 2006/0020975 A1 | 1/2006 | Kenny et al. | |
| 2006/0039699 A1 | 2/2006 | Farmer et al. | |
| 2006/0075428 A1 | 4/2006 | Farmer et al. | |
| 2007/0076717 A1 | 4/2007 | Limb et al. | |

FOREIGN PATENT DOCUMENTS

| | | |
|---|---|---|
| EP | 0566662 A2 | 7/1992 |
| EP | 0713347 A2 | 5/1996 |
| EP | 0720322 A2 | 7/1996 |
| EP | 0955739 A2 | 11/1999 |
| EP | 0933892 B1 | 10/2003 |
| JP | 7-20327 | 1/1995 |
| JP | 10-20123 | 1/1998 |
| JP | 11-305052 | 11/1999 |
| JP | 4-504433 | 3/2002 |
| MX | 180038 | 11/1995 |
| TW | 72821 | 8/1995 |
| WO | WO 01/27940 A2 | 4/2001 |
| WO | WO 02/30019 A3 | 4/2002 |
| WO | WO 02/30020 A2 | 4/2002 |
| WO | WO 02/060123 A2 | 8/2002 |
| WO | WO 03/001737 A3 | 1/2003 |
| WO | WO 03/005611 A2 | 1/2003 |
| WO | WO 03/005612 A1 | 1/2003 |
| WO | WO 03/019243 A2 | 3/2003 |
| WO | WO 03/021820 A1 | 3/2003 |
| WO | WO 03/023980 A2 | 3/2003 |
| WO | WO 03/079567 A1 | 9/2003 |
| WO | WO 03/090396 A2 | 10/2003 |
| WO | WO 2006/014433 A2 | 2/2006 |
| WO | WO 2006/020538 A2 | 2/2006 |
| WO | WO 2006/041784 A2 | 4/2006 |

OTHER PUBLICATIONS

International Search Report dated Oct. 25, 2006 for PCT/US05/35512.
International Search Report dated Nov. 8, 2006 for PCT/US05/28020.
International Search Report dated Feb. 14, 2006 for PCT/US05/46419.
International Search Report dated Feb. 26, 2007 for PCT/US06/11159.
"Trading Update and Operational Review Presentation" Marconi, Sep. 4, 2001, pp. 1-35.
"Cable Market" 2 pgs, Marconi Corporation, PLC, 2000 at www.Marconi.com.
"Communications" 2 pgs, Marconi Corporation, PLC, 2000 at www.Marconi.com.
"Dalton Utilities" 9 pgs, Marconi Corporation, PLC, 2002 at www.Marconi.com.
"Deep Fiber Solutions" 3 pgs, Marconi Corporation, PLC, 2000 at www.Marconi.com.
"Deep Fiber HFC Features and Benefits" 1 pg, Marconi Corporation, PLC, 2002 at www. Marconi.com.
"Deep Fiber HFC Network Diagram" 1 pg, Marconi Corporation, PLC, 2002 at www.Marconi.com.
"Deep Fiber HFC Product Overview: New FITL Configuration" 2 pgs, Marconi Corporation, PLC, 2002 at www.Marconi.com.
"Deep Fiber HFC Technical Specifications" 2 pgs, Marconi Corporation, PLC, 2002 at www.Marconi.com.
"Deep Fiber HFC—New FITL Configuration" 1 pg, Marconi Corporation, PLC, 2002 at www.Marconi.com.
"En-Touch" at 5 pgs, Marconi Corporation, PLC, 2002 www.Marconi.com.
"Fiber to the Home" International Engineering Consortium (no date) pp. 1-10, available at www.iec.com.
"Deep Fiber HFC" Marconi Corporation PLC 2000, pp. 1-2.
"Integrated Voice, Video and Data Services Over a Single Fiber: A Compelling Opportunity for Cable Operators" Marconi Corporation PLC, May 2000, 6 pgs.
"Deep Fiber Solutions: Advanced Broadband Services" Marconi Corporation PLC, MAy 2000, 5 pgs.
"Deep Fiber HFC: A Next-Generation Integrated Access Solution Offering Significant Improvement Over Traditional HFC Architectures" Marconi Corporation PLC, May 2000, 8 pgs.
"A Gold Mine of Opportunities in the Face of Increasing Competition: Choices for Utilities Entering the Communications Marketplace" Marconi Corporation PLC, May 2000, 6 pgs.
"Fiber Optics on New Development MDUs: A Research Summary," Marconi Corporation PLC, May 2000, 5 pgs.
"Thermal Management Challenges: Small ONU Enclosures," Marconi Corporation PLC, May 2000, 9 pgs.
"Passive Optical Networks—Is There Light at the End of the Access Tunnel?" CIBC World Markets Inc., Jan. 11, 2001, pp. 1-66.
"36.2.4 8B/10B transmission code", IEEE 2000, pp. 966-969.
G. Khoe et al., "Coherent Multicarrier Technology for Implementation in the Customer Access," IEEE, May/Jun. 1993, pp. 695-713.
L. Linnell, "A Wide-Band Local Access System Using Emerging-Technology Components," IEEE, Jul. 1986, pp. 612-618.
"Digital Broadband Delivery System: Out of Band Transport—Mode B," Society of Cable Telecommunications Engineers, Inc., Aug. 10, 1998, 76 pgs.
"Digital Broadband Delivery System: Out of Band Transport—Mode A," Society of Cable Telecommunications Engineers, Inc., Aug. 26, 1998, 49 pgs.
B. Gaglianello & P. Thompson, "An Efficient MAC Layer Protocol for EPON," IEEE 802.3 EFM Nov. 2001, 9 pgs.
"Policing and Shaping Overview" *Quality of Service Solutions Configuration Guide*, Cisco Systems, Inc. (No Date).
Cisco IOS™ Software Quality of Service Solutions, Cisco Systems, Inc. 1998, 28 pgs.
International Search Report for PCT/US01/21298, 2 pgs, mailed Jun. 17, 2002.
International Search Report for PCT/US02/03056, 1 pg, mailed Jun. 12, 2002.
"Ethernet—Accelerating the Standard for Speed," 7 pgs, Gigabit Ethernet Alliance, Nov. 2000 www.gigabit-ethernet.org.
"eLuminant—Asynchronous Transfer Mode (ATM) Passive Optical Networks (PONS) Tutorial" 28 pgs, International Engineering Consortium, 2000 at www.iec.org.
International Search Report dated Dec. 4, 2002 for PCT/US02/27398.
International Search Report dated Dec. 17, 2002 for PCT/US02/15861.

Global Access™, Universal Services Gateway, USG100, ARRIS, pp. 1-2, Oct. 18, 2002.

Global Access™, Universal Access Switch, UA4024, ARRIS, pp. 1-2, Aug. 28, 2002.

Partial International Search Report dated Jan. 3, 2003 for PCT/US01/31032.

International Search Report dated Apr. 22, 2003 for PCT/US01/50361.

L. Zhang et al., "Label-switching architecture for IP traffic over WDM networks", IEE Proc.-Commun., vol. 147, No. 5, Oct. 2000, pp. 269-275.

J. Masip-Torné, et al., "Providing Differentiated Service Catagories in Optical Packet Networks", Proceedings of the International Teletraffic Congress, 1999. ITC-16. Teletraffic Engineering in a Competitive World. Edinburgh, UK, Jun. 7-11, 1999, Teletraffic Science and Engineering, Amsterdam: Elsevier, NL, vol. 3B, Jun. 7, 1999, pp. 1115-1126.

J. Bannister et al., "How Many Wavelengths Do We Really Need? A Study of the Performance Limits of Packet Over WaveLengths", Optical Networks Magazin, SPIE, Bellingham, WA, vol. 1, No. 2, Apr. 2000, pp. 17-28.

O. W. W. Yang, et al., "All-Optical WDM/TDM Star-Bus Network Using Optical Amplifiers", Journal of Optical Communications, Fachverlage Schiele & Schon, Berlin, DE, vol. 16, No. 6, Dec, 1, 1995, pp. 216-226.

Walter Ciciora et al., "Modern Cable Television Technology: Video, Voice, and Data Communications", © 1999 by Morgan Kaufman Publishers, Inc., pp. 167-176.

International Search Report dated Apr. 21, 2003 for PCT/US02/28734.

Written Opinion dated May 6, 2003 for PCT/US01/21298.

International Search Report dated Jul. 2, 2003 for PCT/US03/07814.

Angelopoulos J. D. et al, "A Transparent Mac Method for Bandwidth Sharing and CDV Control at the ATM Layer of Passive Optical Networks", Journal of Lightware Technology, IEEE. New York, US, vol. 14, No. 12, Dec. 1, 1996, pp. 2625-2634, XP000642251, ISSN: 0733-8724.

Optical Networks Daily, A Publication of Optical Keyhole, Aug. 26, 2003, pp. 1-13.

International Search Report dated Jul. 7, 2003 for PCT/US01/51350.

International Search Report dated Oct. 3, 2003 for PCT/US03/12231.

G. Scott Glasesemann et al., "The Mechanical Reliability of Corning® Optical Fiber in Bending White Paper," Sep. 2002, pp. 1-4.

Corning® SMF-28™ Optical Fiber Product Information, Corning™ Single-Mode Optical Fiber, Apr. 2002, pp. 1-4.

Bourne, John "Heathrow—Experience and Evolution" IEEE. 1990, pp. 1091-1095.

Miki, Tetsuya. "A Design Concept on Fiber-Optic Wavelength-Division-Multiplexing Subscriber Loop System" WTG-Fachber. 1980, pp. 41-45.

Yamaguchi, K. "A Broadband Access Network Based on Optical Signal Processing: The Photonic Highway" IEEE. 1990, pp. 1030-1037.

Ciciora, Walter S. et al., "Modern Cable Television Technology: Video, Voice, and Data Communications", © 1999, pp. 162-214, Chapter 4, Morgan Kaufmann Publishers, Inc., San Francisco, California.

Companie Deutsch, Components for Fiber Optics, "Triplexers—WDM: FSAN—TPM Series", pp. 1-6.

CEDaily Direct News, "Today's Report", Mar. 19, 2001, pp. 1-5.

Lucent Technologies, "Lucent Technologies Introduces Single-Fiber Network Access Devices for Voice, Video, and Data Services to the HomeCurb", Jun. 6, 2000, pp. 1-2.

Lucent Technologies, "Agere Systems Introduces Single-Fiber Network Access Devices for Voice, Video and Data Services to the Home or Curb", Mar. 19, 2001, pp. 1-3.

Written Opinion dated Feb. 11, 2004 for PCT/US01/50361.

McDevitt, F.R., Switched vs. Broadcast Video for Fiber-to-the-Home Systems, Communications 1990. ICC 90, Including Supercom Technical Sessions. Supercomm/ICC '90. Conference Record, IEEE International Conference on, Apr. 16-19, 1990.

Mangum, K.: Ko, D. Subscriber Loops and Services, 1988. Proceedings, ISSLS 88., International Symposium on, Sep. 11-16, 1988, pp. 208-212.

Han et al., Burst-Mode Penalty of AC-Coupled Optical Recievers Optimized for 8B/10B Line Code, 2004, IEEE.

Coppinger et al., Nonlinear Raman Cross-Talk in a Video Overlay Passive Optical Network, 2003, Tuesday Afternoon, OFC 2003, vol. 1, pp. 285-286.

Piehler et al., Nonlinear Raman Crosstalk in a 125-Mb/s CWDM Overlay on a 1310-nm Video Access Network, 2003, Optical Society of America.

Wong et al., 50-dB Nonlinear Crosstalk Suppression in a WDM Analog Fiber System by Complementary Modulation and Balanced Detection, 2003, IEEE, pp. 500-505.

Perkins, The Art of Overlaying Video Services on a BPON, 2004, Bechtel Corporation, pp. 1-9.

Effenberger et al., "G.983. VideoReturnPath," Oct. 2004, International Telecommunication Union, Telecommunication Standardization Sector, Study Group 15—Contribution 13, pp. 1-18.

Fludger et al., "Pump to Signal RIN Transfer in Raman Fiber Amplifiers", Journal of Lightwave Technology, IEEE. New York, US, vol. 19, No. 8, Dec. Aug. 2001, pp. 1140-1148, ISSN: 0733-8724.

"Spectral Grids for WDM Applications: CWDM Wavelength Grid", International Telecommunication Union, ITU-T, Rec. G.694.2, Dec. 2003, pp. i-iii and pp. 1-4.

International Preliminary Examination Report of Nov. 19, 2003 for PCT/US03/07814.

International Preliminary Report on Patentability of Apr. 1, 2005 for PCT/US01/51350.

International Preliminary Examination Report of Sep. 17, 2004 for PCT/US03/12231.

International Serch Report of Apr. 18, 2006 for PCT/US05/23847.

PCT International Search Report—PCT/US05/28020.

PCT International Search Report—PCT/US05/46419.

PCT International Search Report—PCT/US06/11159.

PCT International Search Report—PCT/US05/35512.

PCT Written Opinion—PCT/US01/21298.

ITC-16. Teletraffic Engineering in a Competitive World.

Raman Crosstalk in Fiber-Optic Hybrid CATV Systems with Wide Channel Separations.

\* cited by examiner

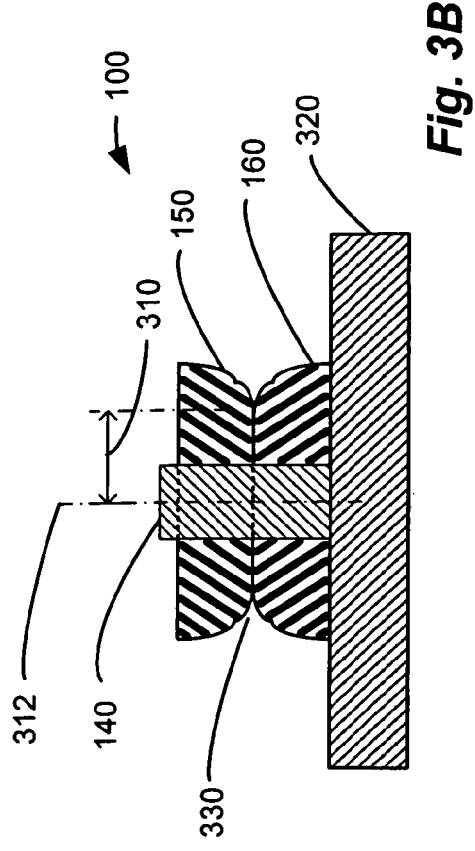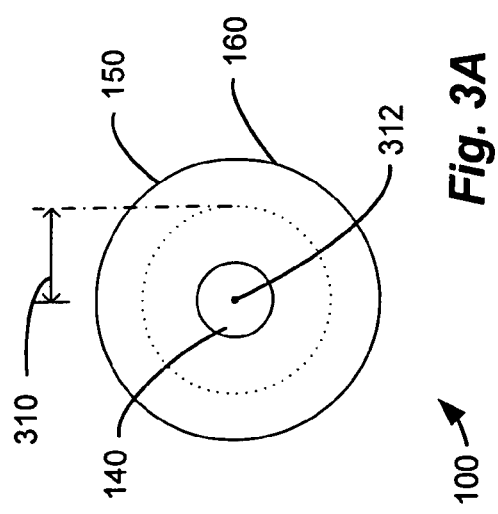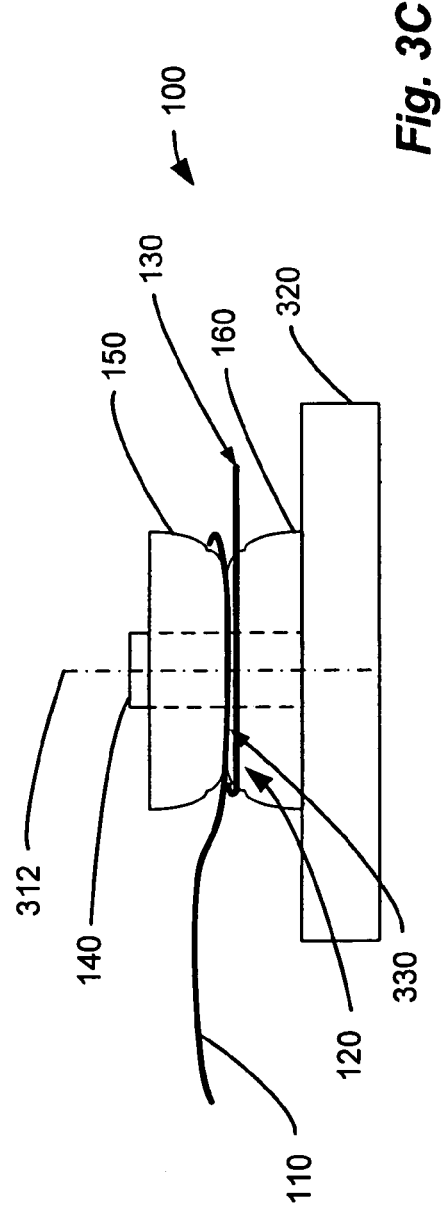

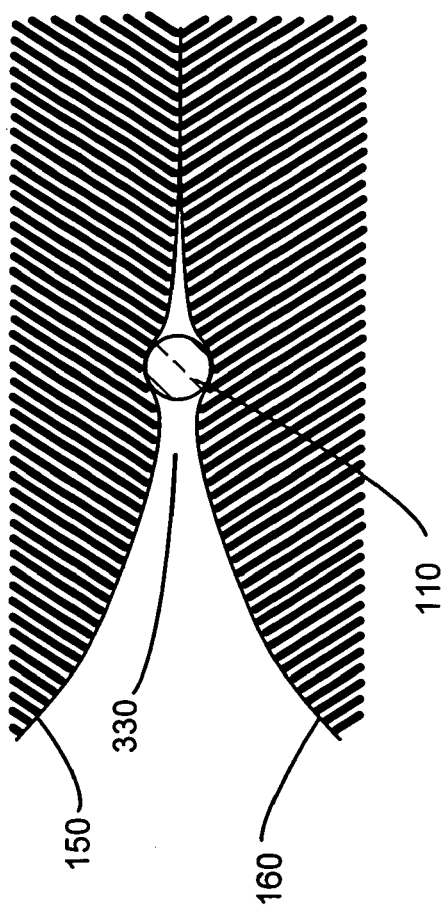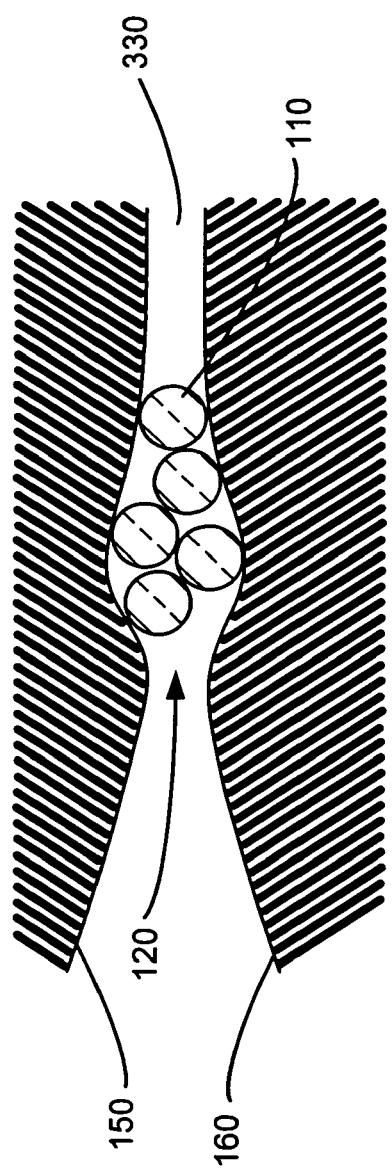

REFLECTION SUPPRESSION FOR AN OPTICAL FIBER

CROSS REFERENCE TO RELATED APPLICATIONS

This application is a continuation of and claims priority to U.S. patent application Ser. No. 10/686,688, filed Oct. 15, 2003, now U.S. Pat. No. 7,058,260 and entitled "Reflection Suppression for an Optical Fiber," the entire contents of which are hereby included herein by reference. U.S. patent application Ser. No. 10/686,688 claims the benefit of priority to U.S. Provisional Application Ser. No. 60/418,271 entitled "Method of Providing Low Cost Termination of an Unused Fiber Optic Strand" filed Oct. 15, 2002. The subject matter of U.S. Provisional Application Ser. No. 60/418,271 is hereby fully incorporated herein by reference.

This application is related to U.S. Non-Provisional application Ser. No. 10/045,439, entitled "Cable Splice Enclosure and Components," filed Nov. 7, 2001. The subject matter of U.S. Non-Provisional application Ser. No. 10/045,439 is hereby fully incorporated herein by reference.

FIELD OF THE INVENTION

The present invention relates to optical fibers and more particularly to managing internally reflected light in fiber optic terminations.

BACKGROUND OF THE INVENTION

Optical fiber is useful in communication networks to transmit digital and analog information via modulated optical signals. In a typical optical network, an optical fiber receives source light from a semiconductor laser, such as a vertical cavity surface emitting laser ("VCSEL"), a Fabry-Perot laser, or a distributed feedback laser ("DFB"). The optical fiber guides the light to an optical detector, which converts optical signals into corresponding electrical signals. Communications equipment processes the electrical signals and decodes the information.

One type of communications equipment that converts optical signals into electrical signals is an optical detector. Optical detectors typically respond to light over a dynamic range. That is, over a range of intensities, most optical detectors produce an electrical signal that linearly corresponds to the intensity of the light that is incident upon the optical detector. If the intensity of the optical signal that is incident upon the optical detector is higher than its dynamic range, the optical detector's performance can suffer. Consequently, assorted conventional devices are available to manage power in an optical network and keep the intensity of the optical signal within an optical detector's dynamic range.

In order to manage power, an optical network can include an optical attenuator positioned in the optical path between an optical source and an optical detector. So deployed, an optical attenuator can reduce the intensity of an optical signal and place it within the dynamic range of an optical detector. That is, conventional optical attenuators generally are power management devices that adjust the strength of an optical signal to optimize an optical detector's response to the optical signal. The conventional art includes numerous types of optical attenuators specific to this purpose. One type of conventional attenuator includes a small-diameter spool around which optical fiber is wrapped. The degree of attenuation is a function of the number of turns of optical fiber on the spool.

While attenuators find conventional utility for managing optical power, other conventional devices are generally used to address optical reflections in an optical network. In point-to-multipoint optical networks, a single light source is optically coupled to multiple fiber optic branches. At any time, some of the branches may be in service, actively transmitting optical signals to a destination, such as an optical detector at a subscriber premises. At the same time, other branches may be spares, held in reserve for network expansion. That is, the typical optical network includes active optical fibers transmitting information from a source to an optical detector and other reserve optical fibers that propagate or carry optical signals to a dead end. In other words, the reserve optical fibers are openly terminated, or are commonly said to be "unterminated." The reserve optical fibers are often optically coupled on one end to a source such as another active optical fiber and remain open on another end. In this network configuration, light can propagate in an optical fiber with an open end face and, when incident on the end face, internally reflect off the open end face. This reflected light can then back propagate in the optical fiber and can interfere with network performance. Such stray light reflections from openly terminated optical fibers in an optical network can cause performance problems.

Specifically, stray reflections from openly terminated optical fibers can impair the performance of an optical communications link by interfering with an optical detector, for example. When a stray reflection propagates in an optical fiber at the same time with another optical signal, an optical detector can confuse the two optical signals. That is, when an optical network concurrently transmits a reflected optical signal and an optical signal supporting desired communication information to an optical detector, the signal-to-noise ratio of the network can suffer.

Stray reflections can also impair the performance of a semiconductor laser. When light reflects off an end face of an optical fiber and back into a semiconductor laser, the back reflected light can interference with the laser's operation. For example, the back reflected light can destabilize the laser's lasing cavity.

An open end face of an optical fiber can internally reflect approximately four percent of the forward propagating light that is incident upon it. A number of conventional approaches have been taken to address such fiber optic back reflections. Isolators are optical devices that suppress back reflections by allowing light to flow in one direction but not in the other. Isolators are often coupled to high performance lasers and generally are considered too expensive for routine fiber optic applications.

Another conventional approach includes adapting the end face of an optical fiber to either minimize the intensity of a back reflection or to prevent back reflected light from back propagating in an optical fiber. Coating the end face with an antireflective film or patterning it with microstructures can minimize the intensity of back reflected light. Cleaving an optical fiber at an angle can produce an end face that deflects light away from the core of an optical fiber so that the optical fiber does not significantly back propagate internal reflections. Implementing these approaches can be cumbersome or expensive, particularly under field conditions.

Another conventional approach includes permanently deforming an optical fiber, for example heating it to diffuse its core into its cladding or by forming a permanent kink in it. These processes typically require special equipment and are irreversible.

Yet another approach includes tying an optical fiber into a knot near an end face of the optical fiber. The knot attenuates the light that is propagating in the optical fiber towards the end face. Although the knot approach is generally convenient and can be implemented without special equipment, it has significant shortcomings. Since the distortion of the optical fiber in the knot is generally uncontrolled, the knot may impose significant and uncontrolled mechanical stress on the optical fiber. Such stress can shorten the life of the optical fiber or cause it to fracture. If a technician unties the knot and couples the optical fiber to an optical detector, the formerly-knotted section of optical fiber can prematurely fail. For example, the optical fiber can break without warning several years after the technician coupled it to an optical detector. Stresses associated with the knot can also cause an optical fiber to catastrophically fracture while it is knotted, for example before it is coupled to an optical detector. If the knotted optical fiber catastrophically fractures in the field resulting in a shatter rather than a clean break, the fracture can induce back reflections. Stresses can also induce micro fractures that cause back reflections, even without catastrophic failure of the optical fiber. If a technician does not tie the knot tight enough, sufficient light may propagate through the knotted section of optical fiber to impair network performance. Furthermore, the possibility exists for vibrations and cyclic heating and cooling to loosen the knot or cause it to come untied.

Another problem with the knotted-fiber approach is that light generally exits the core of the optical fiber over a very short length of optical fiber. For applications involving high-power lasers, for example pump lasers and cutting lasers, the power density of the exiting light in this short section can be high. Over time, the potential exists for such power density to damage the optical fiber's coating or sheathing.

What is needed is a capability for managing back reflected light in an optical system so an end face of an optical fiber does not produce internal reflections that impair the performance of the system. This capability should be predictably reliable and should be conveniently implemented with minimal equipment. Such a capability would facilitate optical networks in cost-sensitive applications, such as fiber-to-the-home.

SUMMARY OF THE INVENTION

The present invention can include managing internal reflections in an optical fiber. An optical fiber can include an optical core surrounded by a cladding. To guide a wave of light along the length of the optical fiber, the core can have a higher refractive index than the cladding. One end of the optical fiber can receive light from a source such as an optical splitter, a semiconductor laser, or another optical fiber. On the opposite end, the optical fiber can have an end face, such as an exposed end face. Light can propagate from the source end to the end face. The end face can internally reflect light, causing it propagate back towards the source end. The present invention can suppress this back reflected light by attenuating light propagating in the optical fiber.

In one aspect of the present invention, a coil in an optical fiber formed with a spool near an end face can suppress internal reflections from the end face by attenuating light propagating to and from the end face. The radius of the spool and corresponding coil of optical fiber can be small enough to impair the core and cladding's ability to guide light. A fraction of the light propagating through the coil formed around the spool can leak out of the core and into the cladding, where it can dissipate and/or be absorbed. The spool can support a number of loops of optical fiber. The fraction of light leaked from the optical fiber can increase as the radius of the spool and corresponding loops decreases and the number of loops supported on the spool increases. The radius of the spool can be chosen small enough and the number of loops of optical fiber on the spool can be chosen large enough to provide a level of attenuation that effectively suppresses end face reflections of the optical fiber. The level of attenuation in the open end optical fiber can be sufficient to meet a requirement such as a return loss specification in an optical networking application.

In another aspect of the present invention, the radius of the spool and the corresponding coil can be sufficiently large to control mechanical stress in the optical fiber. Controlling mechanical stress can provide a predicted reliability and/or lifetime for the optical fiber. Forming the coil around a spool can control the radius. The spool can include a restraint, such as an elastic slot, that holds an optical fiber around the spool until a user releases the optical fiber, straightens out the coil, and places the optical fiber into service.

In another aspect of the present invention, an optical fiber with internal reflection suppression can be a component in an optical system, such as a fiber optic communication link. The optical system can include an enclosure that contains the optical fiber, a spool that controls a coil radius, and an optical splitter coupled to the optical fiber. A drop optical fiber, coupled to the optical splitter, can lead out of the enclosure to an optical detector, such as an information receiver at a customer premises. A distribution optical fiber, also coupled to the splitter, can lead into the enclosure from a laser, such as an information transmitter.

The discussion of managing reflections presented in this summary is for illustrative purposes only. Various aspects of the present invention may be more clearly understood and appreciated from a review of the following detailed description of the disclosed embodiments and by reference to the drawings and claims.

BRIEF DESCRIPTIONS OF THE DRAWINGS

FIG. 3A illustrates an overhead view of a termination attenuation spool according to one exemplary embodiment of the present invention.

FIG. 3B illustrates a cross section side view of a termination attenuation spool according to one exemplary embodiment of the present invention.

FIG. 3C illustrates a side view of termination attenuation spool with an optical fiber according to one exemplary embodiment of the present invention.

FIG. 3D illustrates a detail view of optical fiber wedged in a termination attenuation spool according to one exemplary embodiment of the present invention.

FIG. 3E illustrates a detail view of a plurality of loops of optical fiber wedged in a termination attenuation spool according to one exemplary embodiment of the present invention.

DETAILED DESCRIPTION OF THE EXEMPLARY EMBODIMENTS

Exemplary embodiments of the present invention support managing reflections in optical systems, such as suppressing internal reflections from an end face of an optical fiber. A termination attenuation spool attenuates light propagating forward in an optical fiber towards an exposed end face, and then attenuates the light internally reflected by the end face that back propagates in the optical fiber. Turning now to the drawings, in which like numerals indicate like elements throughout the several figures, preferred and exemplary embodiments of the invention will be described in detail.

Figure 1:
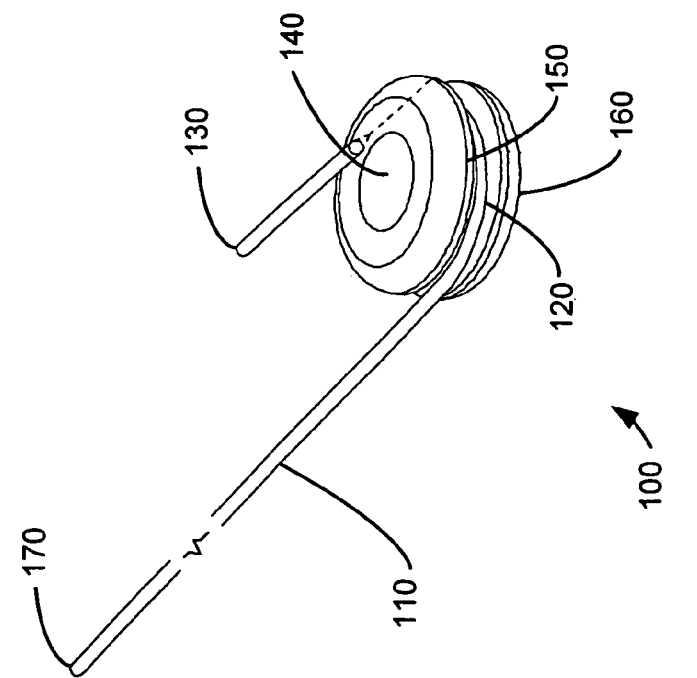
FIG. 1 illustrates a perspective view of an optical fiber coiled around a termination attenuation spool according to one exemplary embodiment of the present invention.

FIG. 1 illustrates a perspective view of an optical fiber 110 coiled around a termination attenuation spool 100. One end face 130 of the optical fiber 110 is exposed to the surrounding environment, which is typically a gaseous medium such as air. The termination attenuation spool 100 includes a top section 150 and a bottom section 160. A cylindrical rod 140 joins the top section 150 and the bottom section 160. The optical fiber 110 is coiled around the termination attenuation spool 100 between the top section 150 and the bottom section 160. The termination attenuation spool 100 controls the radius of curvature of the loops 120 that make up the coil 120 to produce a desired level of attenuation without inducing excessive mechanical stress in the optical fiber 110.

Light propagating forward in the optical fiber 110 from a source end 170 towards the exposed end face 130 propagates around the loops 120. The radius of curvature of the loops 120 is sufficiently small to impair the optical fiber's ability to guide light. That is, the curvature impairs the optical fiber's capacity to function as an optical waveguide. As light propagates around the loops 120, a portion of this light leaks out of the core of the optical fiber 110. The remaining guided light propagates forward in the optical fiber 110 out of the optical fiber loops 120 and towards the exposed end face 130. When this remaining light is incident upon the exposed end face 130, a portion is internally reflected and propagated back towards the source end 170. As the back propagated light propagates through the optical fiber loops 120, a portion of this light also leaks out of the optical fiber core. The radius of curvature of the optical fiber loops 120 is large enough to control mechanical stress in the optical fiber 110 below a level that would damage the optical fiber 110 or otherwise compromise its reliability or intended lifetime.

By attenuating light in two passes, the termination attenuation spool 100 suppresses internal reflections from the exposed end face 130 to a desired level, such as that found in an engineering specification. If the optical fiber 110 is a component of a communication link, such as in an optical network, keeping back reflection below a specified level allows the communication link to meet a performance criterion. For example, suppressing back reflection can facilitate a bit error rate specification in a digital optical communication network or a carrier to noise ratio specification in an analog optical communication network. For example, the engineering requirements of some optical networks specify that every optical element in the network provide a return loss of 35 decibels ("dB") or better. Return loss for an optical element is ten times the common logarithm of the ratio of forward propagating optical power to back propagating optical power.

Figure 2B:
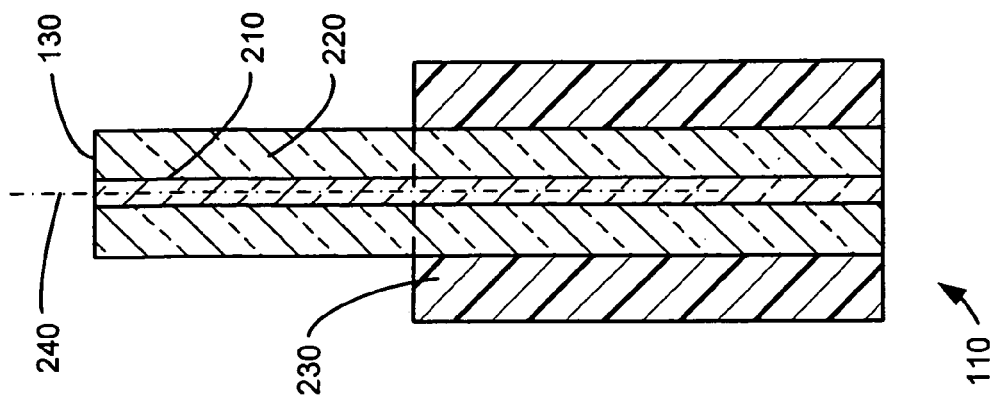
FIG. 2B illustrates a longitudinal cross section view of an optical fiber according to one exemplary embodiment of the present invention.
Figure 2A:
FIG. 2A illustrates an end-on cross section view of an optical fiber according to one exemplary embodiment of the present invention.

FIGS. 2A and 2B illustrate end-on and longitudinal views respectively of an exemplary optical fiber 110 that includes a core 210, a cladding 220, and a coating 230. For illustrative purposes, FIG. 2 and subsequent figures somewhat exaggerate the dimensions of the core 210 and the coating 230 with respect to the cladding 220. The optical fiber 110 has a cladding 220 that axially surrounds a core 210. Both core 210 and cladding 220 are optical materials, such as glass, with the refractive index of the cladding 220 lower than the refractive index of the core 210. With this refractive index differential, light that is in the core 210 traveling along the longitudinal axis 240 of the optical fiber 110 remains in the core 210 and propagates along the length of the optical fiber 110. Thus, the optical fiber 110 functions as a waveguide for the light.

The refractive index differential between the core 210 and the cladding 220 is a factor in the relationship between bend radius and attenuation in a coiled section 120 of optical fiber. High refractive index differentials facilitate subjecting an optical fiber 110 to a tight bend with minimal attenuation. That is, for two tightly coiled optical fibers with unequal refractive index differentials, the coil with the larger differential typically generates less attenuation than the other coil.

As light propagates in an optical fiber 110 coiled around a termination attenuation spool 100, attenuation occurs primarily in the cladding 220. Light coupled into the cladding 220 propagates in an evanescent mode and hence is attenuated exponentially with distance.

FIG. 2B illustrates the optical fiber's exposed end face 130, which is perpendicular to the longitudinal axis 240 of the optical fiber 110. The end face 130 forms an optical interface 130 between the optical fiber 110 and a surrounding gaseous medium such as air. Light propagating forward in the optical fiber 110 towards the end face 130 is incident on the interface 130 between the optical fiber 110 and the surrounding medium as it emits from the optical fiber 110. A portion of the incident light reflects off of the interface 130 and back into the optical fiber 110. For a glass optical fiber 110 exposed to an air medium, the interface 130 internally reflects approximately four percent of the incident light, under typical conditions. Stated another way, the intensity of the back propagated light is approximately 14 dB down from the intensity of the forward propagated light, or the exposed end face 130 generates approximately 14 dB of return loss. With the end face 130 perpendicular to the longitudinal axis 240 of the optical fiber 110, the core 210 accepts the back reflected light, maintains it in a waveguided state, and back propagates it.

Forming the end face 130 at a non perpendicular angle (not shown) with respect to the longitudinal axis 240, reduces the fraction of the forward propagating light that back propagates in the optical fiber 110 as a result of the glass-air interface 130. Although angled end faces are more difficult to fabricate than perpendicular end faces 130, the present invention can suppress back reflections from angled end faces as well as perpendicular end faces 130.

The optical fiber 110 of FIGS. 2A and 2B includes a coating 230 that adheres to the cladding 220. The coating 230 can be a polymer material that protects the glass portions 210, 220 of the optical fiber 110 and promotes structural integrity.

The optical fiber 110 illustrated in FIGS. 1-2 is a step-index, glass single-mode optical fiber with a nominal numerical aperture ("NA") of 0.14 and a mode field diameter of approximately 10 microns. The outer diameters of the core 210, the cladding 220, and the coating 230 are nominally 10, 125, and 250 microns respectively. Corning Incorporated, of Corning, N.Y., markets optical fiber under the registered trademark SMF-28 that is consistent with FIGS. 1 and 2.

The present invention is not limited to a single type of optical fiber or a single fiber optic application. Embodiments of the present invention support and/or include a wide range of optical fibers that are known in the art. Optical fibers known in the art include: multimode optical fiber, all-silica optical fiber, gradient index optical fiber, step index optical fiber, matched cladding optical fiber, depressed cladding optical fiber, and silica-core plastic-clad optical fiber, among others. Some types of optical fiber are highly tolerant to bending, by design. To provide a specified level of reflection suppression for such bending tolerant optical fibers, a termination attenuation spool 100 can have a smaller radius or a larger number of loops 120 than for SMF-28 optical fiber. Furthermore, a termination attenuation spool 100 may produce less attenuation for bending tolerant optical fibers than for ordinary single mode optical fiber 110.

Figure 3F:
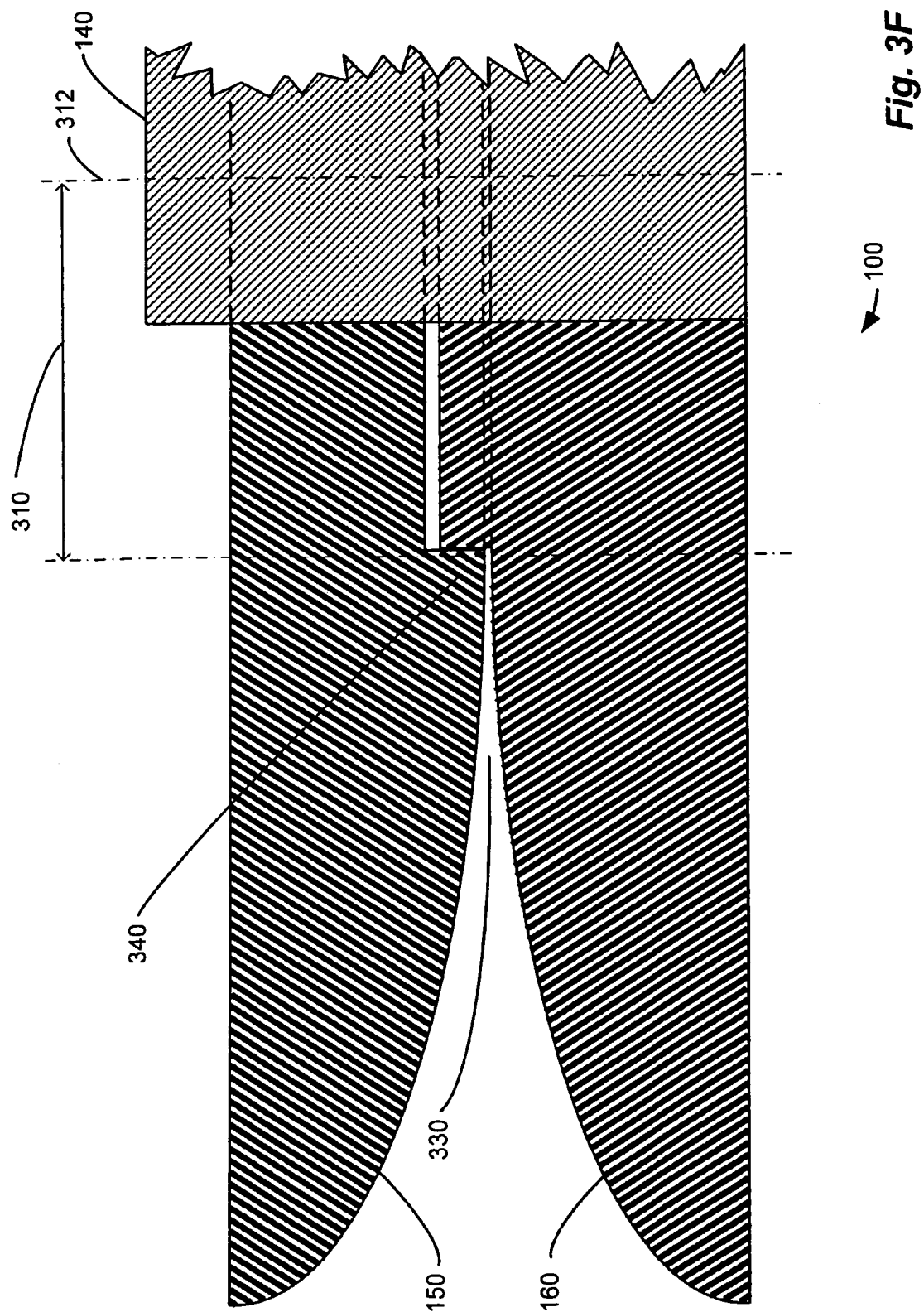
FIG. 3F illustrates a cross section cutaway view of a termination attenuation spool with a shoulder according to one exemplary embodiment of the present invention.

FIGS. 3A-3G illustrate embodiments of a termination attenuation spool 100 and further describe its construction and functionality with an optical fiber 110. FIG. 3A illustrates an overhead view of a termination attenuation spool 100 generally corresponding to the termination attenuation spool 100 illustrated in FIG. 1. The top section 150 and bottom section 160 each have a diametrically-centered through hole. These holes accept a cylindrical rod 140 that joins the two sections 150, 160 together. The cylindrical rod 140 can be formed of a rigid material such as plastic, metal, or ceramic. Suitable plastics include polycarbonate, acrylonitrile-butadiene-stryrene ("ABS"), nylon, acetal, epoxy, and bakelite. Metals can be either ferrous or non-ferrous, including steel, stainless steel, brass, and aluminum. The rod can also be made of elastomeric materials that are sufficiently stiff to provide structural support. Such elastomeric materials can include silicone, natural rubber, neoprene, and ethylene-propylene-diene-methylene ("EPDM"). All of these rod materials are known to those skilled in the art and are available from a variety of commercial sources. The cylindrical rod 140 can be fabricated using a variety of process including molding, vacuum forming, extruding, and machining. The assembly 100 has a radius 310 that controls the radius of curvature of the loops 120 of optical fiber. Optical attenuation can be a function of the number of loops 120 and this radius 310, also referred to as the bend radius 310.

FIG. 3B illustrates a cross section view of a termination attenuation spool 100 mounted on a base 320, such as the floor of an enclosure. The top and bottom sections 150, 160 each have the shape of a convex disk. These disks 150, 160 are mounted so that the convex contours face one another to form a tapered slot 330 or impinging region 330 to receive the optical fiber of the coil 120. The impinging region 330 can constrain the optical fiber 110 that a technician coils 110 around the termination attenuation spool 100.

In one embodiment of the present invention, the disks 150, 160 can be made of a pliable material, such as an elastomer, such as rubber or silicone, with a softness of approximately Shore A Durometer of 60-80. For example, the disks 150, 160 can be fabricated by machining rubber stock that has the approximate hardness of tire rubber. Alternatively, each disk 150, 160 can be molded of synthetic rubber or similar polymer. With the cylindrical rod 140 slightly larger than the through holes and the cylindrical rod 140 made of a rigid material, the disks 150, 160 can be press fit over the rod 140. Alternatively, the cylindrical rod 140 can be slightly undersized and the disks 150, 160 can be glued onto the rod 140. The cylindrical rod 140 can be attached to the base 320 using a variety of processes such as gluing, welding, and treading-tapping operations.

FIG. 3C illustrates a side view of a termination attenuation spool 100 with optical fiber loops 120 coiled around the spool 100. The coiled optical fiber 120 is situated between the two convex disks 150, 160. The impinging region 330 between the two disks 150, 160 can hold the optical fiber loops 120 at a predetermined bend radius 310. Coiling optical fiber 110 on the termination attenuation spool 100 so that the exposed end face 130 is close to the impinging region 330 protects the optical fiber 110 from handling damage. This arrangement facilitates a technician uncoiling the optical fiber 110 from around the termination attenuation spool 100 and deploying it for communication service.

FIG. 3D illustrates a detail view of an optical fiber 110 wedged in an impinging region 330 of a termination attenuator spool 100. The elastic properties of the two disks 150, 160 enable the impinging region 330 to deform around the optical fiber 110 and capture it without causing damaging stress. When the optical fiber 110 is uncoiled from the termination attenuation spool 100, the impinging region 330 returns to its original contour and is ready to accept another optical fiber 110. As illustrated in FIG. 3D, the exact position of an optical fiber 110 in the impinging region 330 varies according to the force with which the optical fiber 110 is wedged into the impinging region 330. Some variation in this position is tolerable while maintaining control over the radius of curvature 310 of coiled fiber. For a reasonable level of force, as might be applied by a technician in the field, the variation in this position can fall within a design window for the termination attenuation spool 100.

FIG. 3E illustrates a detail view of a plurality of loops 120 of optical fiber wedged into an impinging region 330 of an attenuator spool 100. Each loop 120 occupies a slightly different position in the impinging region 330 and consequently has a slightly different radius of curvature 310. Averaging the position of each loop 120 yields an estimate of the radius of curvature 310 that is sufficiently precise to determine attenuation for most applications.

In one embodiment of the present invention, the cylindrical rod 140 that joins the two disks 150, 160 together establishes a minimum radius 310 of the coils 120 of optical fiber. Even if a technician coils the optical fiber 120 into the impinging region 330 with excessive force, the radius of curvature 310 of the coils does not fall below the radius of the cylindrical rod 140. Consequently, the radius of curvature 310 of the coils 120 is greater than the radius of the cylindrical rod 140 and less than the radius of the disks 150, 160. That is, the termination attenuation spool 100 controls the radius of curvature 310 of the loops 120 of optical fiber within a minimum and maximum value. These minimum and maximum levels can define stress and attenuation levels in the optical fiber 110.

FIG. 3F illustrates a cross section cutaway view of a termination attenuation spool 100 that has a shoulder 340 between the adjoining surfaces of two mated disks 150, 160. The shoulder 340 defines the minimum radius 310 of each coil 120 of optical fiber that is wedged into the impinging region 330. The shoulder 340, which is a protrusion of the bottom disk 160, mates into a cavity of the upper disk 150. In one embodiment, the shapes of the disks 150 and 160 are reversed.

Figure 3G:
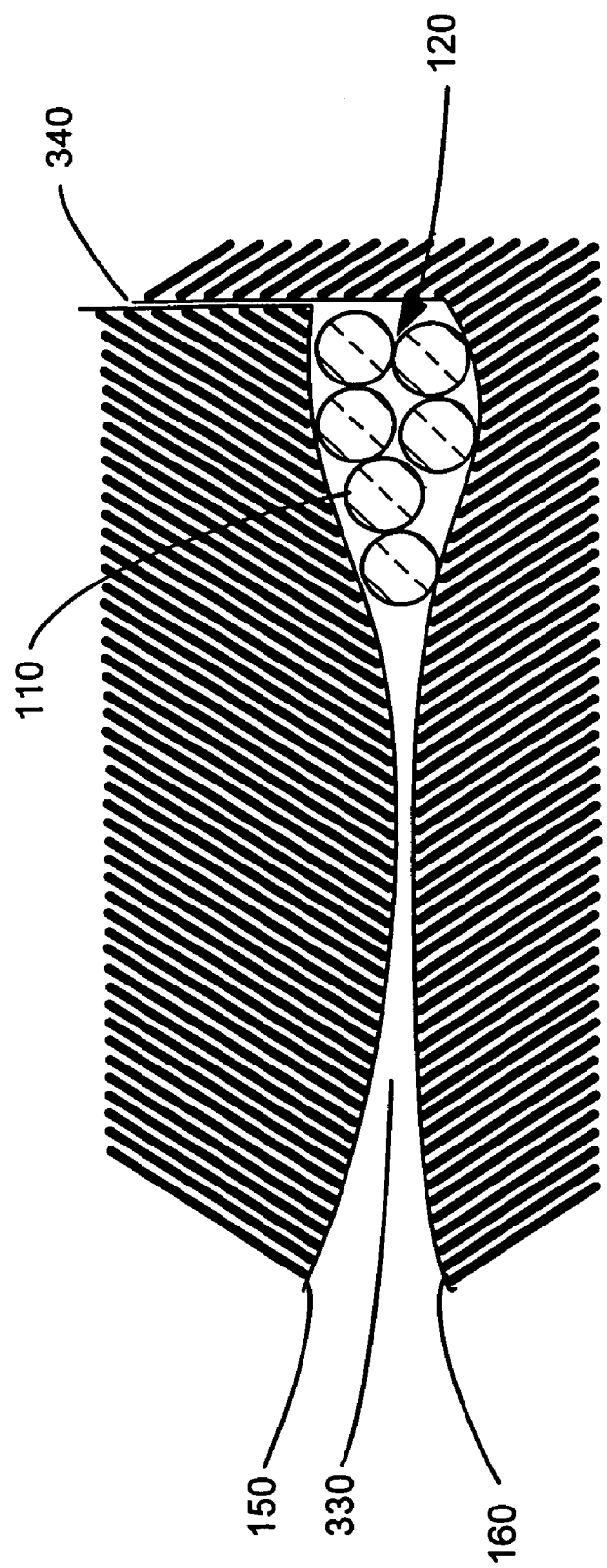
FIG. 3G illustrates a detail view of a plurality of loops of optical fiber formed around a termination attenuation spool with a shoulder according to one exemplary embodiment of the present invention.

FIG. 3G illustrates a detail view of a plurality of loops 120 of optical fiber coiled around a termination attenuation spool 100 and wedged into an impinging region 120 against a shoulder 340. As illustrated in this figure, the shoulder 340 controls the radius of the loops 120 more precisely than a termination attenuation spool 100 with an impinging region 330 that does not have a shoulder 340 or similar structure.

Those skilled in the art recognize that the present invention is not limited to a spool 100, which is one embodiment of a coiling device or a radius controlling device. Other coiling devices include, but are not limited to, mandrels, drums or any other round object of suitable diameter.

In an alternate embodiment (not shown) of the present invention, a cylindrical rod functions as a mandrel for the loops 120 of optical fiber. The radius of the mandrel defines the radius of curvature of the coil 120. The outer surface of the mandrel, which contacts the coiled optical fiber 120, can be soft so as to prevent damaging the optical fiber 120, such as abrading or nicking it. The mandrel can be mounted on a base, for example perpendicular to the plane of the base. A technician can coil optical fiber 110 around the mandrel. A detachable clip or a slot in the mandrel can hold the coiled optical fiber 120 on the mandrel.

In another alternate embodiment (not shown) of the present invention, the termination attenuation spool 100 is molded into a solid piece of synthetic rubber or similar polymer. In this embodiment, a cylindrical rod 140 is not needed to join two halves of the spool 100 together. A through hole in the center of the spool 100 can be formed in the molding process or by a post-molding drilling process. A bolt inserted in the through hole can be used to attach the termination attenuation spool 100 to a base 320 such as the housing of an enclosure.

Figure 4:
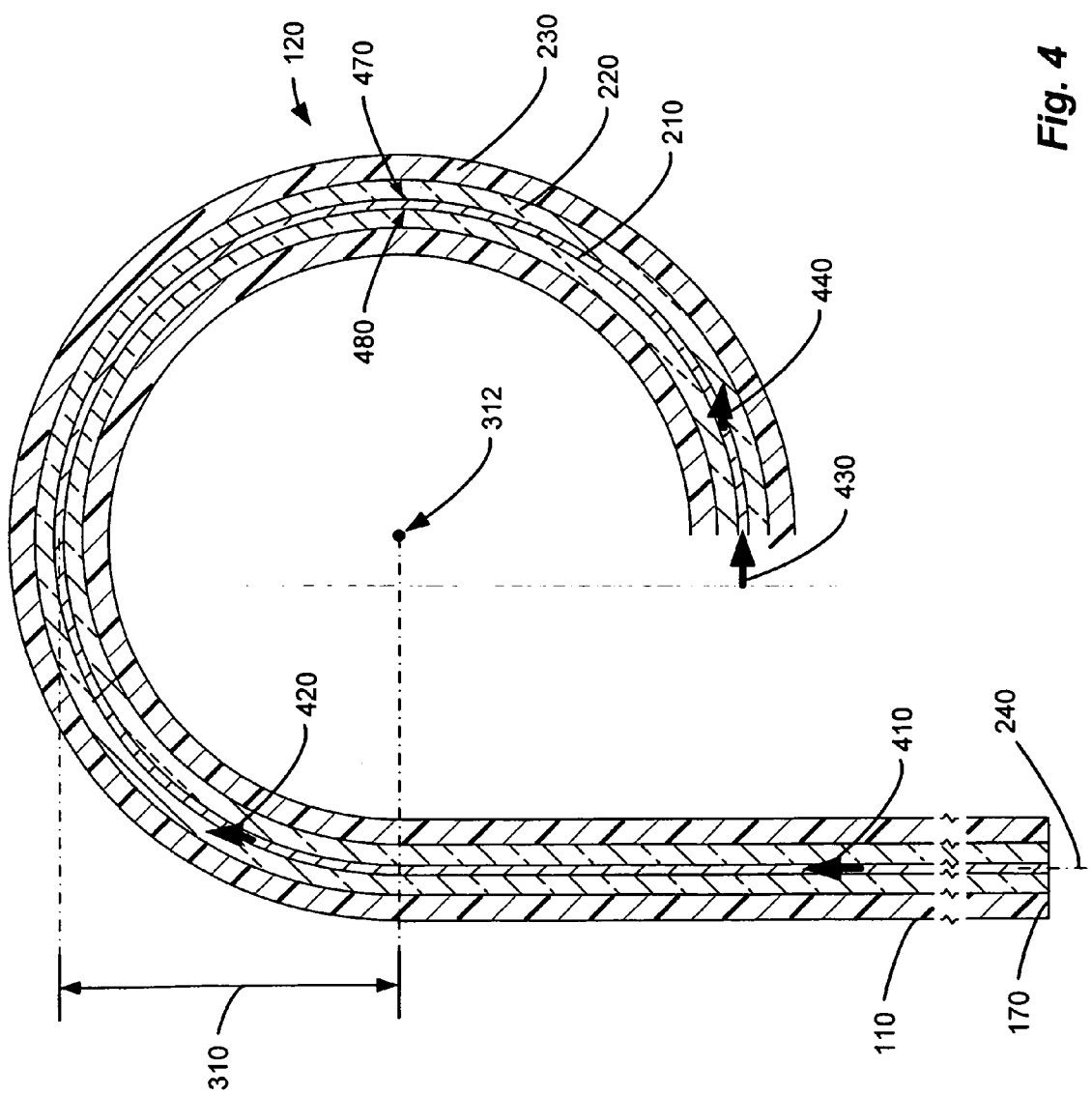
FIG. 4 illustrates a cross sectional view an optical fiber formed into an attenuation loop according to one exemplary embodiment of the present invention.

FIG. 4 illustrates a cross section view of a loop 120 of optical fiber within a coiled section 120 that attenuates light propagating therein. FIG. 4 exaggerates the diameter of the optical fiber 110 with respect to the radius of curvature 310 of the coil 120 for illustrative purposes. Forward propagating light 410, which is propagating away from the source end 170 towards the exposed end face 130, enters the coil 120 and encounters a radius of curvature 310 that impairs the optical fiber's waveguiding capabilities. The curvature causes a portion 420 of the forward propagating light 410 to leak out of the core 210 and into the cladding 220. Attenuation primarily takes place in the cladding 220. Light coupled into the cladding 220 propagates in an evanescent mode and is attenuated exponentially with distance.

The coil 120 is optically symmetrical in that it provides approximately the same level of attenuation for forward propagating light 410 as it does for back propagating light 430. A portion 440 of the back propagating light 430, which propagates towards the source end 170 away from the exposed end face 130, leaks out of the core 210 and into the cladding 220 where it is attenuated.

The phenomenon of a tight bend in an optical fiber 110 inducing attenuation has been described both in terms of ray theory and mode theory. In the context of ray optics, the light that leaks out of the core 210 and into the cladding 220 is sometimes referred to as "leaky rays" that refract out of the core 210 and into the cladding 220. In the context of mode theory of light propagation, which is often applied to single-mode optical fiber, the light that leaks out of the core 210 and into the cladding 220 is sometimes referred to as "leaky modes" that mode couple out of the core 210 and into the cladding 220. Both ray theory and mode theory support intuitive and mathematically rigorous treatments of the phenomenon. An intuitive explanation according to a mode theory follows immediately below with reference to FIG. 4.

Single mode optical fiber 110 propagates light in a planar wavefront based on the refractive index profile of the optical fiber 110. That is, the portion of the light field that is at the center 240 of the core 210 travels at the same speed as the portion of the light field that is at the core-cladding interface 470, 480. A wavefront can be visualized as a plane of light traveling along the optical fiber's longitudinal axis 240 with the plane perpendicular to that longitudinal axis 240.

When the optical fiber 110 is formed into a coil 120 with a tight radius, there is an outer core-cladding interface 470 and an inner core-cladding interface 480. The inner core-cladding interface 480 is closer to the center 312 of the coil 120, than the outer core-cladding interface 470. Consequently, the circumference of the outer core-cladding interface 470 is significantly larger than the circumference of the inner core-cladding interface 480. However, the light field follows both circumferences as it propagates through the loop 120. To maintain the single mode optical fiber's planar wavefront, the portion of the light field at the outer core-cladding interface 470 needs to travel faster than the portion of the light field at the inner core-cladding interface 480; however, the optical fiber's materials do not provide for such a speed differential.

The curvature in the coil 120 may compress the optical materials at the inner core-cladding interface 480 and stretch the optical materials at the outer core-cladding interface 470. This material deformation may slightly increase the average refractive index at the inner core-cladding interface 480 and slightly decrease the average refractive index at the outer core cladding interface 470. However, any such material deformation that may exist does not sufficiently alter the refractive index profile to support the planar wavefront of single-mode propagation. That is, the portion of the wavefront that is at the outer core-cladding interface 470 does not travel significantly faster than the portion of the wavefront that is at the inner core-cladding interface 480. Thus, for single-mode, waveguided propagation, a fraction of the light in the coil 120 needs to travel faster than the physics of the optical fiber 110 supports. This fraction of light couples out of the core 210 and into the cladding 220. According to both theory and experimental results, attenuation increases as the bend radius 310 decreases and the number of loops 120 in a coil 120 increases.

Figures 5A, 5B:
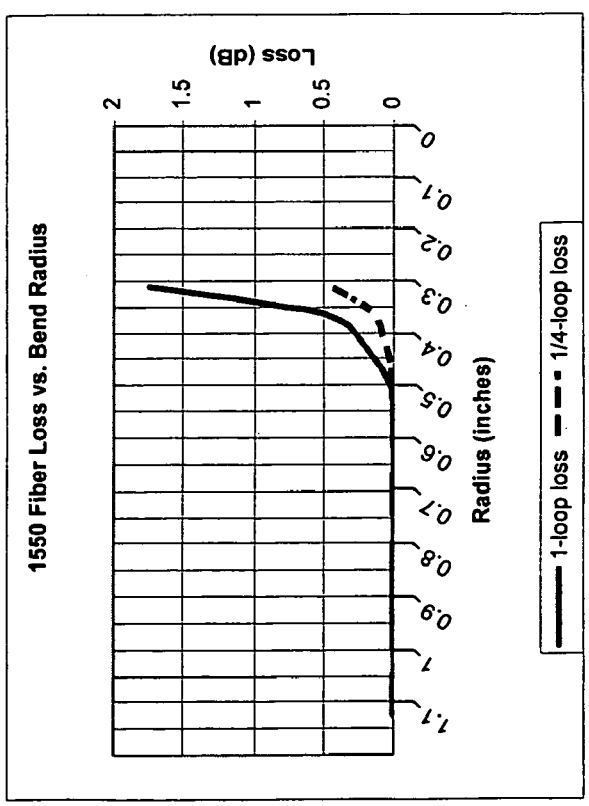
FIGS. 5A and 5B illustrate optical attenuation data for an optical fiber coiled around a termination attenuation spool according to one exemplary embodiment of the present invention.

FIG. 5A and FIG. 5B illustrate measured optical attenuation data for optical fiber 110 coiled under typical conditions. FIG. 5A presents transmission loss data in graphical format 500 as a function of radius of curvature for 1550 nanometer ("nm") light propagating in an optical fiber 110 coiled around a termination attenuation spool 100. The dashed line, which is on the right, presents data for a quarter-loop, while the solid line, which is on the left, presents data for a full loop. Scaling these data according to the number of loops calculates total attenuation for a termination attenuation spool 100 with multiple loops.

For example, according to the data, a termination attenuation spool 100 having a radius of 8.9 millimeters (0.35 inches) provides approximately 0.75 dB of attenuation per loop 120. Since the termination attenuation spool 100 attenuates both forward and back propagated light, a coil 120 formed around this spool 100 provides 1.5 dB (0.75 dB+0.75 dB=1.5 dB) of net attenuation per loop 120. As described above, an exposed end face 130 generates approximately 14 dB of return loss. For a network that requires at least 35 dB of return loss, the termination attenuation spool 100 needs to provide at least 21 dB (35 dB−14 dB=21 dB) of total attenuation for the forward and backward propagating signal to meet the requirement. Thus, in this example of a spool 100 having a radius of 8.9 millimeters (0.35 inches), the coil 120 should include at least 14 loops (1.5 dB×14=21 dB) in order to meet the network's return loss requirement. The optical return loss is 21 dB (forward and backward passes around the attenuating spool) plus 14 dB corresponding to the reflection from an open-ended optical fiber. This results in a net optical return loss of 35 dB.

The graph 500 also illustrates that attenuation is highly non-linear with respect to radius of curvature. Below 12.7 millimeters (0.5 inches), bending loss increases rapidly as the loop's radius 310 decreases. In one embodiment of the present invention, the coil 120 has a radius 310 less than 12.7 millimeters (0.5 inches). In one embodiment of the present invention, the coil 120 has a radius 310 less than 9.5 millimeters (0.375 inches). In one embodiment of the present invention, the coil 120 has a radius 310 less than 6.35 millimeters (0.25 inches).

Physical stresses associated with bending an optical fiber 110 can shorten its predicted lifetime. Suppliers often proof test and grade optical fiber according to the stress that it can withstand. For a given application, higher proof test optical fiber typically has a longer expected lifetime than lower proof test optical fiber. Suppliers also may provide statistical data that predicts expected lifetime on the basis of the length of time that various bend radii 310 are applied to an optical fiber 110. The supplier may also predict expected lifetime on the basis of the length of the section of optical fiber that is subjected to various bend radii.

Corning Incorporated, of Corning, N.Y., makes such data available within the public domain for its optical fibers. For its SMF-28 optical fiber that has been proof tested to 0.69 GPa (100 kpsi), Corning provides statistical lifetime predictions for a one-meter length of optical fiber subjected to a various bend radii as follows. With a continuous 6-millimeter bend radius, the optical fiber stands a 1-in-10,000 chance of failing over a 20-to-40 year lifetime. With a 10-millimeter bend radius, the optical fiber stands a 1-in-100,000 chance of failing during the same lifetime. With a 16-millimeter bend radius, the optical fiber stands a 1-in-1,000,000 chance of failing during the same lifetime.

For optical fibers with less than one meter subjected to these bend radii, the probability of failure is lower than these predictions. If the termination attenuation spool 100 has less than one meter of coiled optical fiber 120, the radius of the coil 120 can be smaller than the listed bend radii while maintaining the listed probabilities of failure and lifetimes.

In one embodiment of the present invention, the radius 310 of the coil 120 is at least 2 millimeters. In one embodiment of the present invention, the radius 310 of the coil 120 is at least 3 millimeters. In one embodiment of the present invention, the radius 310 of the coil 120 is at least 5 millimeters.

The supplier's reliability and lifetime data facilitates engineering a fiber optic system on the basis of reliability and lifetime requirements. For example, a submarine or an outer-space application may require more stringent reliability and lifetime standards than a fiber-to-the-home application.

Thus, the radius 310 of the termination attenuation spool 100 can be selected according to a reliability standard or a predicted lifetime for the optical fiber 110. Based on this radius 310, the number of loops 120 of optical fiber can be selected according to a desired level of return loss. The return loss can be defined on the basis of network performance, such as bit error rate or carrier-to-noise ratio. The return loss specification can be based on a requirement for the network that all components deployed in the network meet or exceed a return loss threshold.

FIG. 5B is a table that illustrates attenuation per loop 120 at 1310 nm and 1550 nm for a termination attenuation spool 100 having a radius of 4.8 millimeters (3/16 inches). Based on these data, coiling an optical fiber 110 with six loops 120 around such a spool 100 provides 22.8 dB of return loss enhancement at 1310 nm. Added to 14 dB of inherent return loss from an exposed end face 130, the termination attenuation spool 100 achieves a total return loss of 36.8 dB. This value meets the specification of a network that requires at least 35 dB of return loss.

Those skilled in the art can appreciate that the present invention supports optimizing the design parameters of a termination attenuation spool 100 to meet lifetime, reliability, and return loss requirements. For example, the termination attenuation spool 100 can be factor in determining reliability and lifetime for an optical communication system that includes optoelectronic components.

Figure 6:
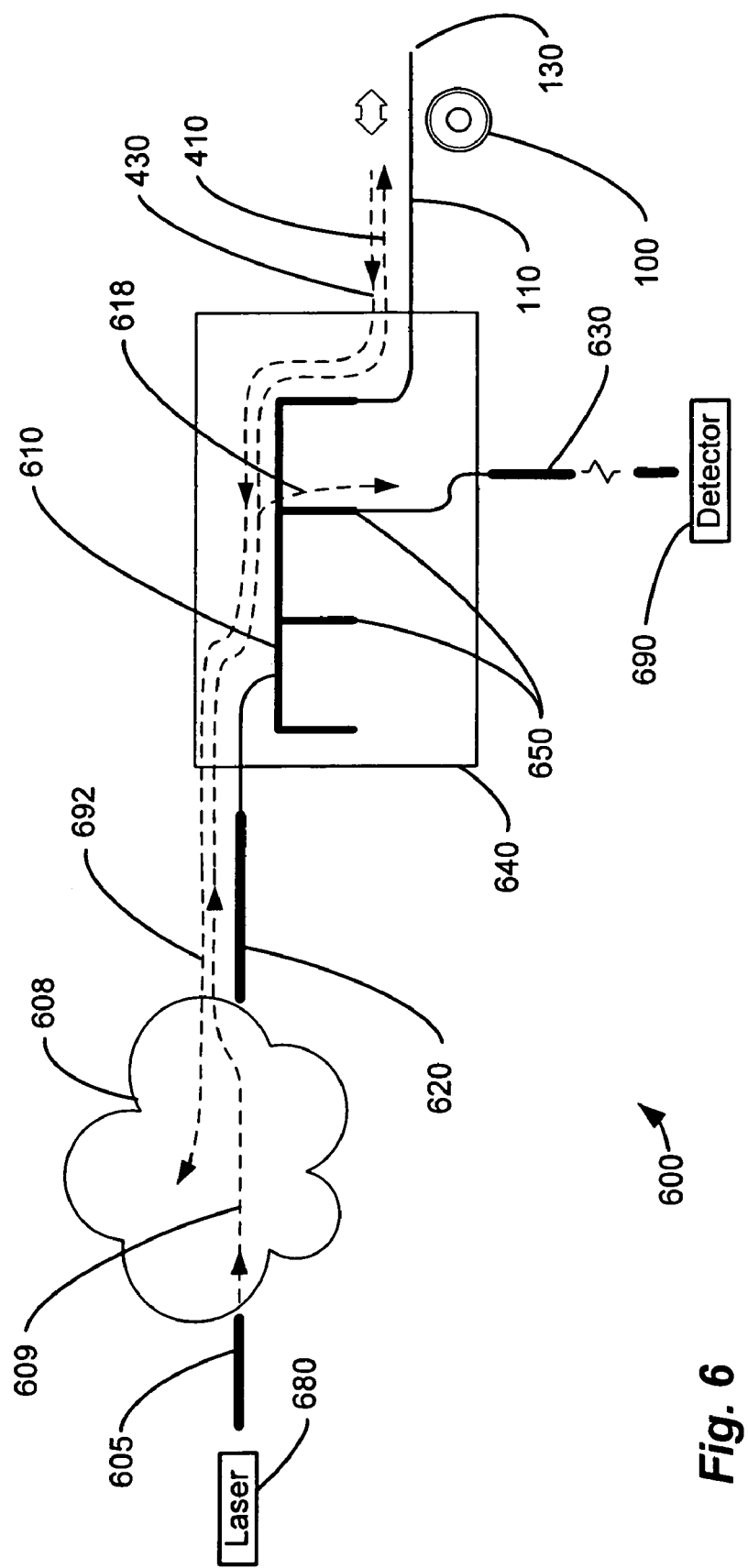
FIG. 6 illustrates forward and back propagated optical signals in a fiber optic system that includes a pigtail optical fiber coupled to an optical splitter prior to coiling the optical fiber around a termination attenuation spool according to one embodiment of the present invention.

FIG. 6 illustrates an exemplary optical network system 600 with a communication link between a laser 680 and a detector 690. The system 600 further includes a pigtail optical fiber 110 and a termination attenuation spool 100 prior to coiling the pigtail optical fiber 110 onto the termination attenuation spool 100. In this state, the pigtail optical fiber's exposed end face 130 generates an internal reflection that can impair the performance of the optical system 600.

The system 600 includes a semiconductor laser 680 that launches source light 609 into a section of distribution optical fiber 605, which couples the laser 680 to an optical network 600, 608. Either direct modulation of the laser 680 or external modulation of the light 609 emitted by the laser 680 modulates a signal onto the source light 609. The signal 609 may be a digital signal or an analog signal or both. The communication link between the laser 680 and the detector 690 passes through a region 608 of the optical network 600, 608 that can be coupled to other data links and optical networking devices that are not illustrated in FIG. 6. Another section of distribution optical fiber 620 transmits the optical signal 609 out of this optical network region 608 and to an optical splitter 610.

The optical splitter 610 receives the optical signal 609 from the distribution optical fiber 620 and feeds it to a plurality of optical ports 650 coupled to egress optical fibers 630, 110. The fiber optic splice tray 640 manages and protects the splitter 610 and its associated optical fibers 620, 630, 110. FIG. 6 illustrates two exemplary egress optical fibers 630, 110 connected the splitter ports 650. In a typical field application, the splitter 610 is a source for four, six, eight, sixteen, or more egress optical fibers 630, 110. In one embodiment of the present invention, the optical splitter 610 is an optical combiner. In one embodiment of the present invention, the optical splitter 610 is an optical coupler. In one embodiment of the present invention, in addition to splitting optical signals, the optical splitter 610 is functional to combine optical signals.

One 630 of the two egress optical fibers 630, 110 is a drop optical fiber 630 that carries a portion 618 of the optical signal light 609 to a semiconductor optical detector 690. The semiconductor optical detector 690 receives the optical signal 618 and generates a corresponding electronic signal.

The other egress optical fiber 110 is a pigtail optical fiber 110 with an exposed end face 130. Although not in service, the pigtail optical fiber 110 is optically active and carries an optical signal 410 from the optical splitter 610 that has similar optical power to the optical signal 618 in the drop optical fiber 630.

The optical signal 410 from the optical splitter 610 propagates forward in the pigtail optical fiber 110 towards its exposed end face 130. Back reflected light 430 from the exposed end face 130 propagates backwards towards the optical splitter 610. The optical splitter 610 couples the back reflected light 430 from the optical pigtail 110 into the distribution optical fiber 620. The distribution optical fiber 620 propagates this back reflected light 692 into a region 608 of the optical network 600, 608 that can be coupled to a variety of other data links and optical networking components (not illustrated). Here, the stray back reflected light 692 can interfere with the performance of such networking components and data links.

If stray back reflected light 692 transmits in a data link along with an optical signal that supports desired communication information, the data link's detector can respond to the stray light 430 thereby degrading signal-to-noise ratio of that data link. Also, back reflected light 692 propagating in the distribution optical fiber 620 can interact with the semiconductor laser 680 and add noise to its optical signal, thereby reducing the communication performance of the system 600.

FIG. 6 illustrates the pigtail optical fiber 110 in an uncoiled state. Coiling the pigtail optical fiber 110 around the termination attenuation spool 100 suppresses back reflections 410, 692 and prevents them from degrading communication performance of the optical network 600, 608. When the pigtail optical fiber 110 is coiled around the termination attenuation spool 100, the optical signals 410, 430 propagating to and from the end face 130 are attenuated. Although a residual optical signal 692 remains after two attenuation passes around the termination attenuation spool, its intensity is weak. The intensity of the residual optical signal 430 that back propagates in the distribution optical fiber 620 is reduced to support communication performance of the optical networking system 600.

Figure 7:
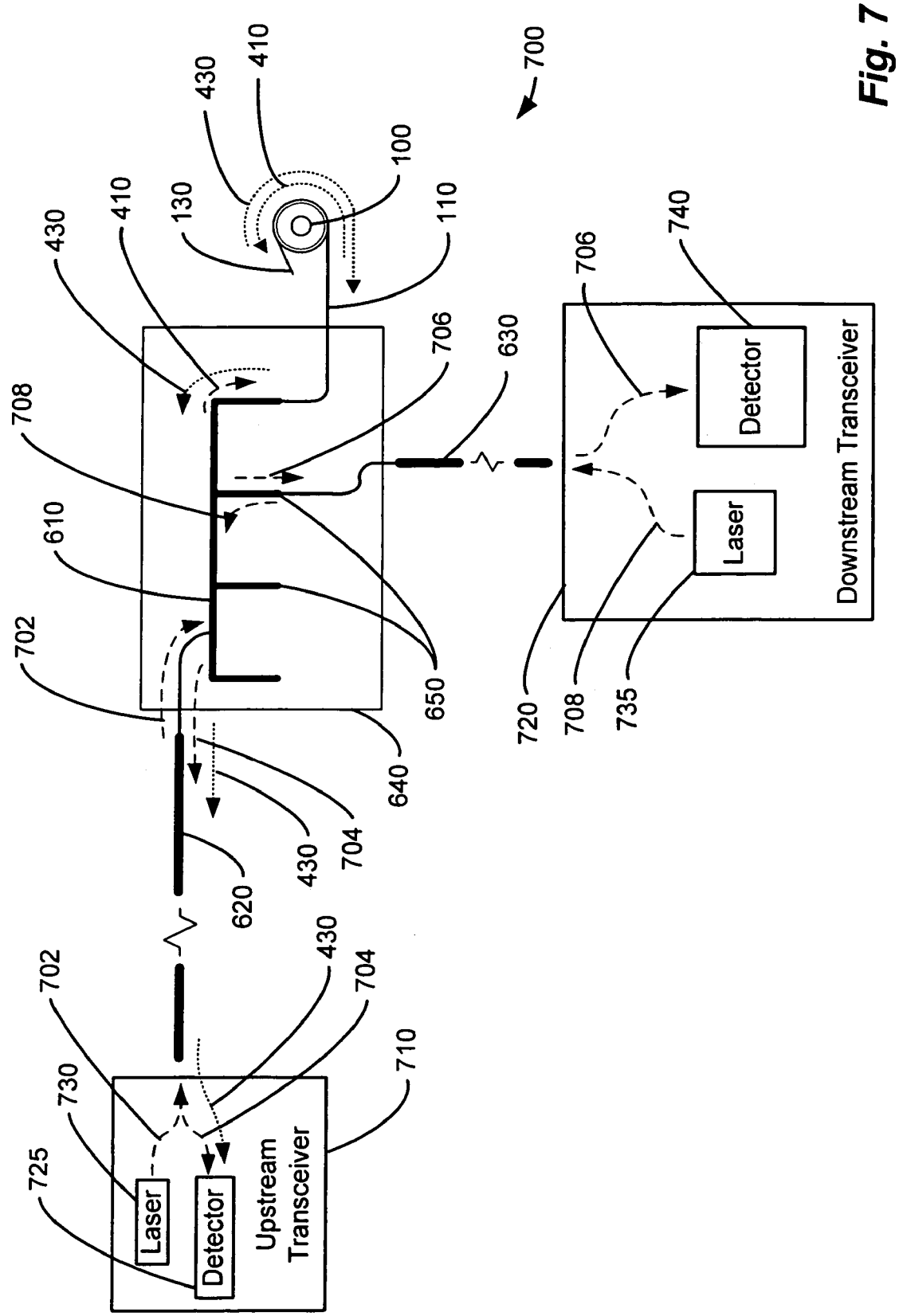
FIG. 7 illustrates suppression of back reflected optical signals in a bidirectional fiber optic system that includes two transceivers and a pigtail optical fiber coiled around a termination attenuation spool according to one exemplary embodiment of the present invention.

FIG. 7 illustrates a bi-directional fiber optic system 700 with a termination attenuation spool 100 to suppress reflections from a pigtail optical fiber 110. An upstream transceiver 710 sends optical signals 702 to and receives optical signals 704 from a downstream transceiver 720 over a fiber optic link that includes a distribution optical fiber 620, an optical splitter 610, and a drop optical fiber 630. The upstream transceiver 710 includes a laser 730 that launches optical signals 702 into the distribution optical fiber 620 and an optical detector 725 that receives optical signals 704 from the distribution optical fiber 620.

The upstream laser 730 launches an optical signal 702 into the distribution optical fiber 620, which propagates this downstream optical signal 702 in the downstream direction to an optical splitter 610. The optical splitter 610 splits the downstream optical signal 702 between a drop optical fiber 630 and a pigtail optical fiber 110 with an exposed end face 130. The drop optical fiber 630 receives a portion 706 of the downstream optical signal 702 from the optical splitter 610 and transmits this portion 706 to the downstream transceiver 720. An optical detector 740 in the downstream transceiver 720 receives this downstream optical signal 706 and generates a corresponding electrical signal. Communication equipment (not shown) coupled to the downstream transceiver 720 typically processes information encoded in the electronic signal and generates information for communication back to the upstream transceiver 710.

The laser 735 in the downstream optical transceiver 720 launches an upstream optical signal 708 into the drop optical fiber 630. The drop optical fiber 630 propagates the upstream optical signal 708 in the upstream direction to the optical splitter 610. The optical splitter 610 directs this upstream optical signal 704, 708 into the distribution optical fiber 620. The distribution optical fiber 620 propagates the upstream optical signal 704 to the upstream transceiver 710. The upstream transceiver's optical detector 725 receives the upstream optical signal 704 and generates a corresponding electrical signal.

Bidirectional communication, in which a single optical fiber 620, 630 sends and receives optical signals, is particularly susceptible to unsuppressed reflections. Unsuppressed reflections can propagate along with the optical signals that support desired communication and interfere with a detector's performance in isolating the desired communication signal. In other words, stray back reflections that are too strong diminish an optical detector's capacity to discriminate between a desired optical signal and those reflections.

As described above, the optical splitter 610 receives the downstream optical signal 702 from the laser 730 in the upstream transceiver 710 and splits it between a drop optical fiber 630 and a pigtail optical fiber 110, as well as splitting the downstream optical signal 702 between any other ports on the optical splitter 610. The pigtail optical fiber 110 propagates its portion of this downstream optical signal 410 to a section of optical fiber coiled around a termination attenuation spool 100. The optical signal 410 is attenuated as it propagates around the termination attenuation spool 100 towards the end face 130 of the pigtail optical fiber 110. The end face 130 back reflects a portion of this downstream optical signal 410. The pigtail optical fiber 110 captures the back reflected downstream optical signal 430 and propagates it in an upstream direction towards the optical splitter 610. As the back reflected downstream optical signal 430 propagates upstream in the pigtail optical fiber 110 around the termination attenuation spool 100, it is attenuated.

The two attenuating passes around the termination attenuation spool significantly reduce the optical power in the residual downstream optical signal 430 that is propagating upstream in the drop optical fiber 110 towards the optical splitter 610. In one embodiment of the present invention, the optical power in this residual optical signal 430 is 35 dB below the optical power of the downstream optical signal that is coupled in the downstream direction out of the optical splitter 610 and into the pigtail optical fiber 110.

The optical splitter 610 receives the residual back reflected downstream optical signal 430 and couples it into the distribution optical fiber 620, which propagates it to the upstream transceiver 710. The residual back reflected downstream optical signal 430 is coupled into the upstream transceiver's optical detector 725 along with the upstream optical signal 704 from the laser 735 in the downstream transceiver 720. That is, two optical signals 430, 704 are coupled into the upstream transceiver's detector 725, one 704 that supports desired communication and one 430 with the potential to interfere with desired communication.

With the optical fiber pigtail 130 coiled around the termination attenuation spool 100, the strength of the back reflection is suppressed to a level that reduces its capacity to interfere with desired communication. The portion 430 of the back reflection that reaches the upstream transceiver's detector 725 is weak. That is, suppressing back reflections from the exposed end face 130 improves the signal-to-noise ratio of the communication system 700. Such signal-to-noise ratio performance can be a carrier-to-noise ratio for analog communication or a bit error rate for digital communication.

Figure 8:
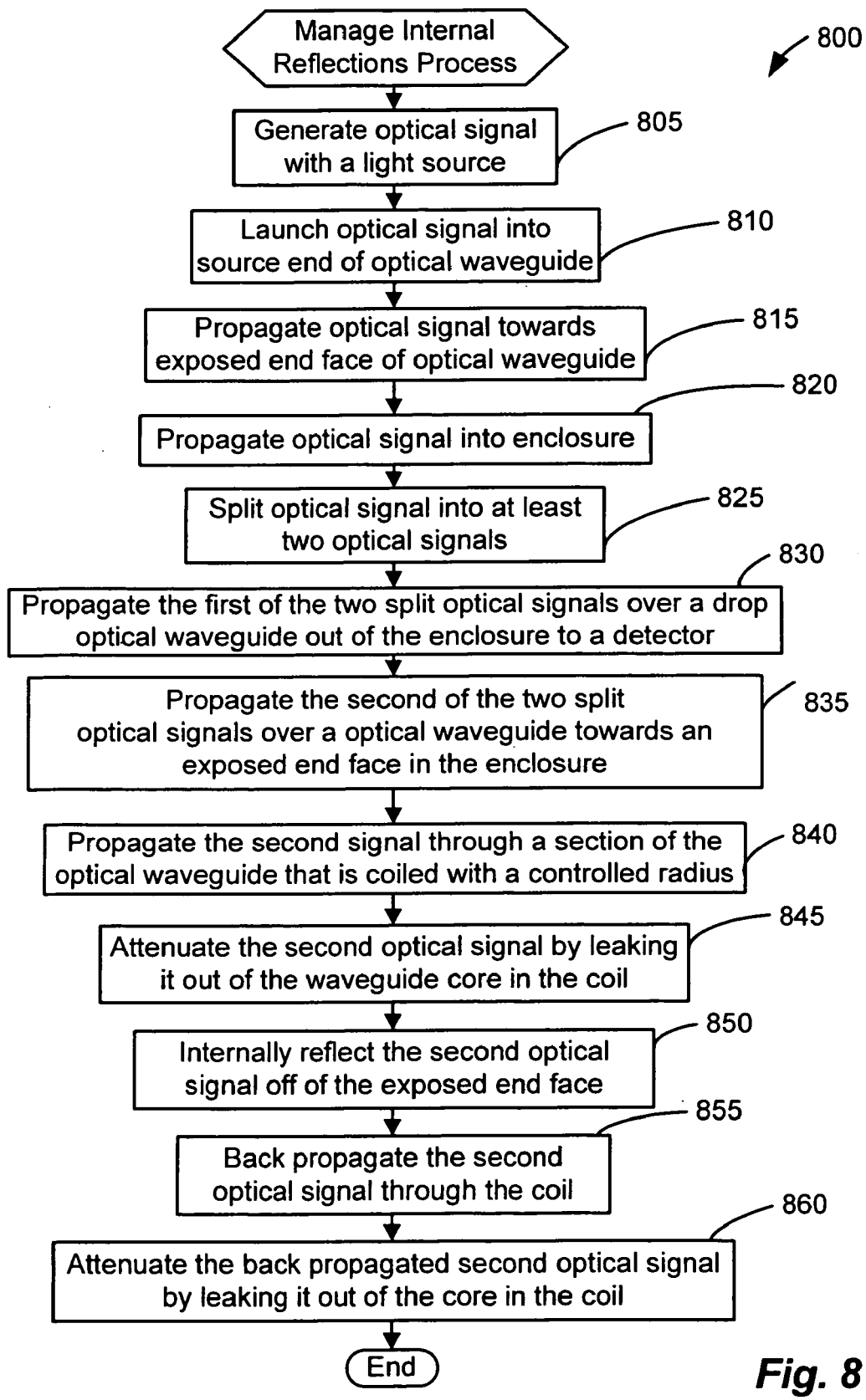
FIG. 8 illustrates a process for managing internal reflections in a fiber optic system according to an exemplary embodiment of the present invention.

FIG. 8 illustrates a process 800 for managing back reflections in a fiber optic system according to one embodiment of the present invention. Step 805 is the first step of Process 800. In Step 805, a light source such as a semiconductor laser 680 generates an optical signal. At Step 810, the semiconductor laser 680 launches the optical signal into the source end of an optical waveguide 620. At Step 815, the optical waveguide 620 propagates the optical signal towards an exposed end face 130 of an optical waveguide 110 that is opposite the source end. At Step 820, the optical waveguide 620 propagates the optical signal into an enclosure (illustrated in FIG. 8 and described below).

In Step 825, an optical splitter 610 in the enclosure splits the optical signal into a first and a second optical signal. At Step 830, an optical waveguide such as a drop optical fiber 630 propagates the first optical signal 410 out of the enclosure to an optical detector 690. At Step 835, an optical waveguide 110 such as a pigtail optical fiber receives the second optical signal 410 from the splitter 610 and propagates it towards an exposed end face 130.

At Step 840, the optical waveguide 110 propagates the second optical signal 410 through a section 120 of optical waveguide 110 coiled around a termination attenuation spool 100. At Step 845, the termination attenuation spool 100 attenuates the second optical signal 410 by leaking a portion 420 of it out of the core 210 of the optical waveguide 110. At Step 850, the exposed end face 130 back reflects the second optical signal 430. At Step 855, the optical waveguide 110 back propagates the second optical signal 430 through the section 120 of optical waveguide 110 coiled around the termination attenuation spool 100. At Step 860, the termination attenuation spool 100 attenuates the back propagated optical signal 430 by leaking a portion 440 of it out of the core 210 of the optical waveguide 110.

Figure 9:
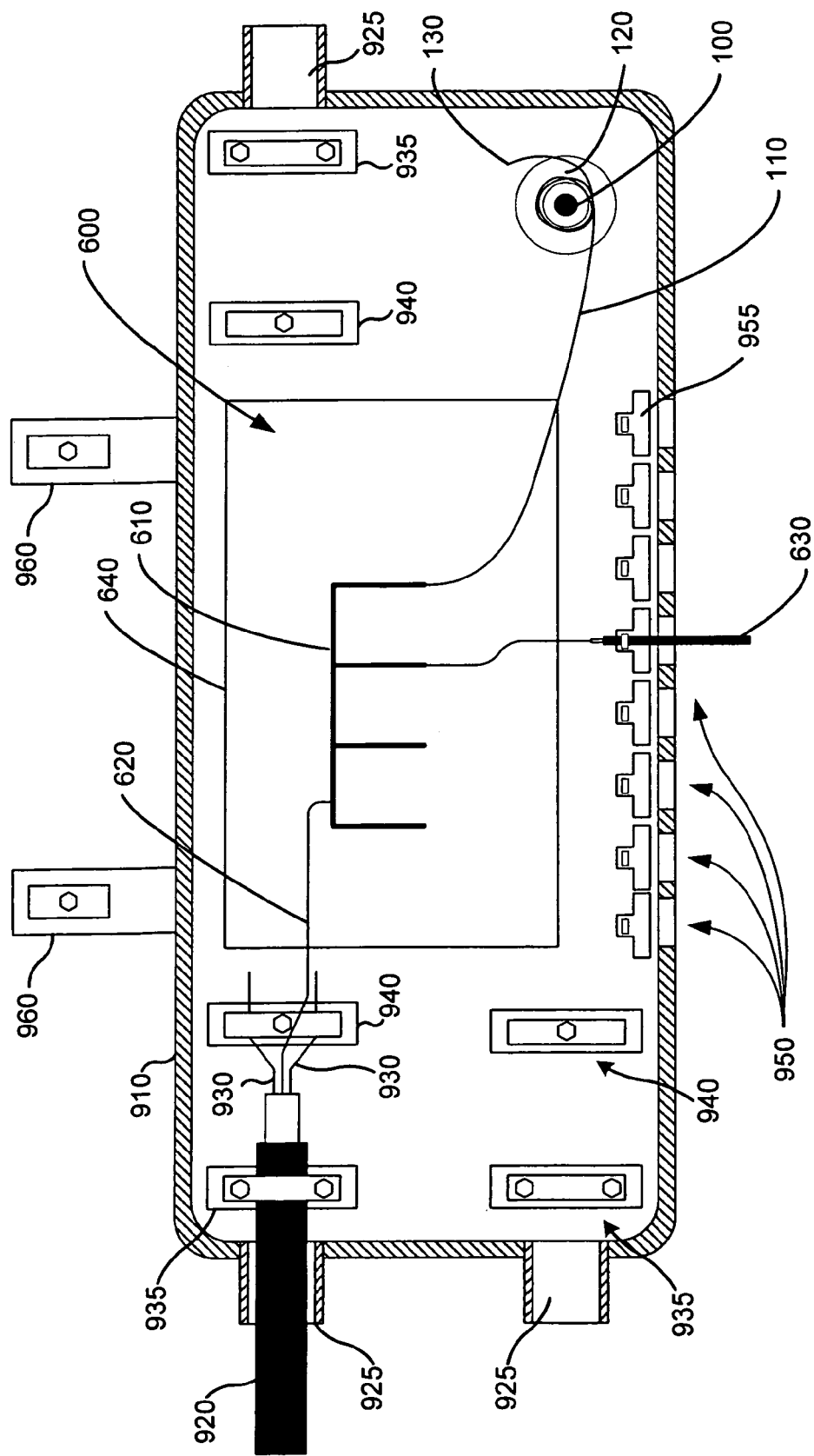
FIG. 9 illustrates a cross section of a fiber optic module including an enclosure and a termination attenuation spool for suppressing back reflection in an optical pigtail optical fiber according to one exemplary embodiment of the present invention.

FIG. 9 illustrates a cross section of an exemplary optomechanical system 900 that includes an optical subsystem 600 mounted in an enclosure 910 for field deployment according to one exemplary embodiment of the present invention. The optical system 600 generally corresponds the optical system 600 illustrated in FIG. 7 and includes an optical fiber 620 that feeds an optical splitter 610, which is mounted in a receptacle or similar mount in the enclosure 910. The optical splitter 610 feeds a drop optical fiber 630 and a pigtail optical fiber 110. The drop optical fiber 630 leads out of the enclosure 910 through a drop port 950. The illustrated enclosure 910 has eight exemplary drop ports 950. Other enclosure embodiments can include various numbers of drop ports 950. The pigtail optical fiber 110 is coiled in loops 120 around a termination attenuation spool 100 so that the end face 130 of the pigtail optical fiber 110 is internal to the enclosure 910 and exposed to the air or gaseous environment of the inside of the enclosure 910. The termination attenuation spool 100 mounts on the floor of the enclosure's housing 910. A fiber optic splice tray 640 or similar apparatus manages drop optical fibers 630 and pigtail optical fibers 110 inside the enclosure to promote organization and avoid handling stress.

The optical fiber 620 that feeds the optical splitter 610 is a distribution optical fiber 620 that is a component in a distribution cable 920. The distribution cable 920 enters the enclosure 910 through a cable port 925. The distribution cable 920 includes strength members 930 that prevent uncontrolled tensional stress from being transferred to the optical fiber 620. Strength members 930 can comprise one or more strands 930 of metal, fiberglass, Kevlar, or other flexible, low-stretch material. The cable port 925 can include a watertight seal (not shown) to prevent moisture from entering the enclosure 910. In one embodiment of the present invention, this seal is a hermetic seal. The enclosure 910 includes three cable ports 925 for distribution cables 920. This arrangement of cable ports 925 accommodates several configurations for mounting and using the system 900.

A cable strain-relief device 935, which is adjacent each cable port 925, holds the distribution cable 920 in place with respect to the housing 910. The cable strain-relief device 935 grasps the distribution cable 920 with a hose clamp or screw fastener arrangement or by glue, weld, or other attachment system. In operation, the cable strain-relief device 935 is coupled both to the housing structure 910 and to the distribution cable 920.

A strength-member strain relief device 940, which is situated near each cable strain relief device 935, grasps the distribution cable's strength members 930 with a mechanical clamp, glue, or other fastening system. The strength-member strain-relief device 940 is attached to the housing 910 with bolts or screws, or by gluing, welding, or other methods. In operation, the strength-member strain-relief device 940 is coupled both to the housing structure 910 and to the distribution cable's strength members 930.

The enclosure 910 includes a cover plate (not shown) that attaches to the housing 910 and seals the optical subsystem 600 of the system 900. The housing 910 can be constructed from a variety of materials such as metal or molded plastic. The housing also includes mounting brackets 960. For field deployment, a technician can attach the system 900 to an overhead cable or a rigid structure such as a building wall using the mounting brackets 960.

The diameter of the drop ports 950 is smaller than the diameter of the cable ports 925 since the drop optical fibers 630 are typically thinner than the distribution cables 920. A drop strain-relief device 955, which is adjacent each drop port 950, grasps each drop optical fiber 630. The drop strain-relief device 955 prevents stress on the portion of the drop optical fiber 630 that is external to the enclosure 910 from transferring to the optical splitter 610. If a sheath, such as a hollow tube with accompanying strength members, encases and protects each drop optical fiber 630, the drop strain-relief device 955 can grasp the sheath or the strength members rather than the drop optical fiber 630 itself. The drop strain relief device 955 can be coupled to housing 910 with bolts or screws, or by gluing, welding, or other methods.

While FIG. 9 illustrates a single drop optical fiber 630 and a single pigtail optical fiber 110 coupled to the optical splitter 610, the present invention supports managing numerous drop optical fibers 630 and pigtail optical fibers 110. In one embodiment of the present invention, a single termination attenuation spool 100 manages multiple optical fibers 110. In another embodiment of the present invention, each spool 100 manages a single optical fiber 110, and the enclosure 910 contains multiple spools 100. A field technician can bring a spare pigtail optical fiber 110 into service by uncoiling it from the termination attenuation spool 100 and threading it through a port 950. Alternatively, a field technician can fuse a long optical fiber to the pigtail optical fiber 110 and thread the lengthened optical fiber through the port 950. Also, a field technician can remove a drop optical fiber 630 from service, pull it back through the port 950, and coil it onto the termination attenuation spool 100. The unused optical fiber pigtail 110 may have a connector (not shown) on it which may be connected at some future time to another optical fiber so that the pair functions as a drop optical fiber, similar to the illustrated drop optical fiber 630.

As illustrated in FIG. 7, in one embodiment of the present invention, the distribution optical fiber 620 receives light 702 from a source such as a semiconductor laser 725 and delivers this light 702 to an optical splitter 610. The drop optical fiber 630 receives light 706 from the optical splitter 610 and delivers this light 706 to an optical detector 740. In one embodiment of the present invention, the drop optical fiber 630 couples to an optical detector 740 at a specific physical location, such as a home or office building. To bring service to a new customer, a technician uncoils a spare pigtail optical fiber 110 from the termination attenuation spool 100 and couples the optical fiber 110, either directly or through an intermediate optical fiber, to an optical detector 740 at the customer's premises.

One skilled in the art would appreciate that the present invention supports managing back reflections in optical fiber systems such as optical networks. In one embodiment, the present invention suppresses internal reflections from an exposed end face of an optical fiber that is optically active but is held in reserve for future service. Forming a coil of controlled radius adjacent an exposed end face of an optical fiber suppresses back reflections from that end face. The radius of the coil is small enough to impair the optical fiber's ability to maintain a waveguided state and large enough to control mechanical stress in the optical fiber coil.

A termination attenuation spool can suppress reflections by attenuating light in two passes. In the first pass, a fraction of the forward propagating light in the coil, which propagates towards the end face, leaks out of the optical fiber's core and does not reach the end face. The end face back reflects another fraction of the forward propagating light that makes it through the coil and is incident upon the end face. In the second pass, the optical fiber captures a portion of the back reflected light and guides it back to the coil. As this light back propagates through the coil, a fraction leaks out of the optical fiber's core.

From the foregoing, it will be appreciated that the preferred embodiment of the present invention overcomes the limitations of the prior art. From the description of the preferred embodiment, equivalents of the elements shown herein will suggest themselves to those skilled in the art, and ways of constructing other embodiments of the present invention will suggest themselves to practitioners of the art. Therefore, the scope of the present invention is to be limited only by the claims below.

What is claimed is:

1. An optical enclosure system comprising:
    a housing comprising an interior surface and an exterior surface;
    a port between the interior surface and the exterior surface of the housing; and
    a coiling device attached to the interior surface of the housing, wherein the coiling device comprises a slot having deformable sidewalls, the coiling device comprising two disks, each disk having a convex crossectional profile and one side of each profile forming one of the deformable sidewalls.

2. The optical enclosure system of claim 1, wherein the coiling device comprises a release formed by the deformable sidewalls of the disks.

3. The optical enclosure system of claim 1, wherein the coiling device comprises a restraining device formed by the deformable sidewalls.

4. The optical enclosure system of claim 1, wherein the coiling device comprises a spool formed by the two disks.

5. The optical enclosure system of claim 1, wherein the coiling device comprises a cylindrical member formed by the two disks that comprises the slot.

6. The optical enclosure system of claim 1, wherein the walls are first and second walls, the slot being formed by the second deformable sidewall facing the first deformable sidewall.

7. The optical enclosure system of claim 1, wherein the coiling device comprises a cylinder formed by the two disks,
    wherein the slot comprises a circumferential groove in the cylinder with a depth and a width, and
    wherein the groove width gradually decreases along the groove depth.

8. The optical enclosure system of claim 1, wherein the port comprises a drop port and wherein the optical enclosure system further comprises a distribution port between the interior surface and the exterior surface of the housing.

9. The optical enclosure system of claim 1, further comprising a base attached to the interior surface of the housing, wherein the coiling device is mounted on the base.

10. The optical enclosure system of claim 9, further comprising a receptacle and a strain relief attached to the base, wherein the strain relief is adjacent the port.

11. The optical enclosure system of claim 1, further comprising a wall mounting bracket attached to the exterior surface of the housing.

12. A network expansion enclosure comprising:
    a housing having an interior volume;
    a port in the housing, the port providing access to the interior volume of the housing;
    a strain relief mounted adjacent the port and within the interior volume of the housing; and
    a spool mounted within the interior volume of the housing, wherein the spool comprises a cylinder having a circumferential groove with a depth and a width, the groove width gradually decreasing along the groove depth, the spool comprising two disks, each disk having a convex crossectional profile and one side of each profile forming a deformable sidewall.

13. The network expansion enclosure of claim 12, wherein the circumferential groove comprises a tapered slot.

14. The network expansion enclosure of claim 12, wherein the circumferential groove comprises an impinging region.

15. The network expansion enclosure of claim 12, wherein the circumferential groove has curved sidewalls formed by the two disks.

16. The network expansion enclosure of claim 12, wherein the port comprises a distribution port, and wherein the network expansion enclosure further comprises:

a mounting bracket attached to an exterior surface of the housing;

an array of drop ports in the housing, each providing access to the interior volume of the housing; and a plurality of spools, each mounted within the interior volume of the housing.

* * * * *